US011410659B1

(12) United States Patent
Singh et al.

(10) Patent No.: US 11,410,659 B1
(45) Date of Patent: Aug. 9, 2022

(54) DYNAMIC SKILL ENDPOINT

(71) Applicant: Amazon Technologies, Inc., Seattle, WA (US)

(72) Inventors: Veer Yuganter Singh, Seattle, WA (US); Saravana Prasad Stalin, Redmond, WA (US); Sabrina Chandrasekaran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 16/833,950

(22) Filed: Mar. 30, 2020

(51) Int. Cl.
*G10L 15/22* (2006.01)
*G10L 15/26* (2006.01)
*G10L 15/30* (2013.01)

(52) U.S. Cl.
CPC .............. *G10L 15/26* (2013.01); *G10L 15/22* (2013.01); *G10L 15/30* (2013.01)

(58) Field of Classification Search
CPC .......... G10L 15/22; G10L 15/26; G10L 15/30
See application file for complete search history.

(56) References Cited

U.S. PATENT DOCUMENTS

| 9,081,770 | B2* | 7/2015 | Fish ................... H04M 1/72412 |
| 2008/0285575 | A1* | 11/2008 | Biswas ............... H04L 41/0246 370/401 |
| 2013/0290547 | A1* | 10/2013 | Berkema ................. H04L 67/14 709/227 |
| 2017/0135407 | A1* | 5/2017 | Cameron ................ A24F 40/60 |
| 2017/0236512 | A1* | 8/2017 | Williams ................. H04R 3/12 381/79 |
| 2018/0212825 | A1* | 7/2018 | Umbehocker .......... H04L 41/12 |
| 2018/0375953 | A1* | 12/2018 | Casassa Mont .... H04L 61/2015 |
| 2019/0007228 | A1* | 1/2019 | Vuskovic ................ G06F 16/00 |
| 2019/0045476 | A1* | 2/2019 | He ....................... H04W 72/048 |
| 2019/0073998 | A1* | 3/2019 | Leblang ............... G06F 16/3344 |
| 2019/0279647 | A1* | 9/2019 | Jones ........................ G10L 21/18 |
| 2019/0288922 | A1* | 9/2019 | Viklund ................. H04L 67/32 |
| 2020/0142544 | A1* | 5/2020 | Fleck ...................... G06F 9/451 |
| 2020/0152205 | A1* | 5/2020 | Sayyadi-Harikandehei ................ G10L 15/22 |
| 2020/0193483 | A1* | 6/2020 | Lee ....................... G06F 16/958 |
| 2020/0220791 | A1* | 7/2020 | Aiello ..................... H04L 41/12 |
| 2020/0304580 | A1* | 9/2020 | Kou ...................... H04L 67/146 |

(Continued)

*Primary Examiner* — Daniel C Washburn
*Assistant Examiner* — Oluwadamilola M Ogunbiyi
(74) *Attorney, Agent, or Firm* — Pierce Atwood LLP

(57) ABSTRACT

This disclosure proposes systems and methods employing dynamic skill endpoints by allowing skills to register themselves with a language processing system. The language processing system allows the skill system to open a persistent network connection to the language processing system. This connection does not require the machine(s) running the skill system to have an Internet routable address; rather the skill system can contact the language processing system, which can remain at a static address, through any local routers or firewalls which may block connections from being initiated from outside the local area network. This registration opens the connection between the skill system and the language processing system. When the language processing system receives a skill invocation request indicating the skill, the language processing system can check its registry for a dynamic endpoint corresponding to the skill, and route the request over the network connection to the registered endpoint.

20 Claims, 21 Drawing Sheets

(56) References Cited

U.S. PATENT DOCUMENTS

| | | | |
|---|---|---|---|
| 2020/0320297 A1* | 10/2020 | Ahn | B25J 19/02 |
| 2021/0132926 A1* | 5/2021 | Wangikar | G06F 8/60 |
| 2021/0211431 A1* | 7/2021 | Albero | H04L 63/102 |
| 2021/0350290 A1* | 11/2021 | Fredette | G06Q 30/08 |

* cited by examiner

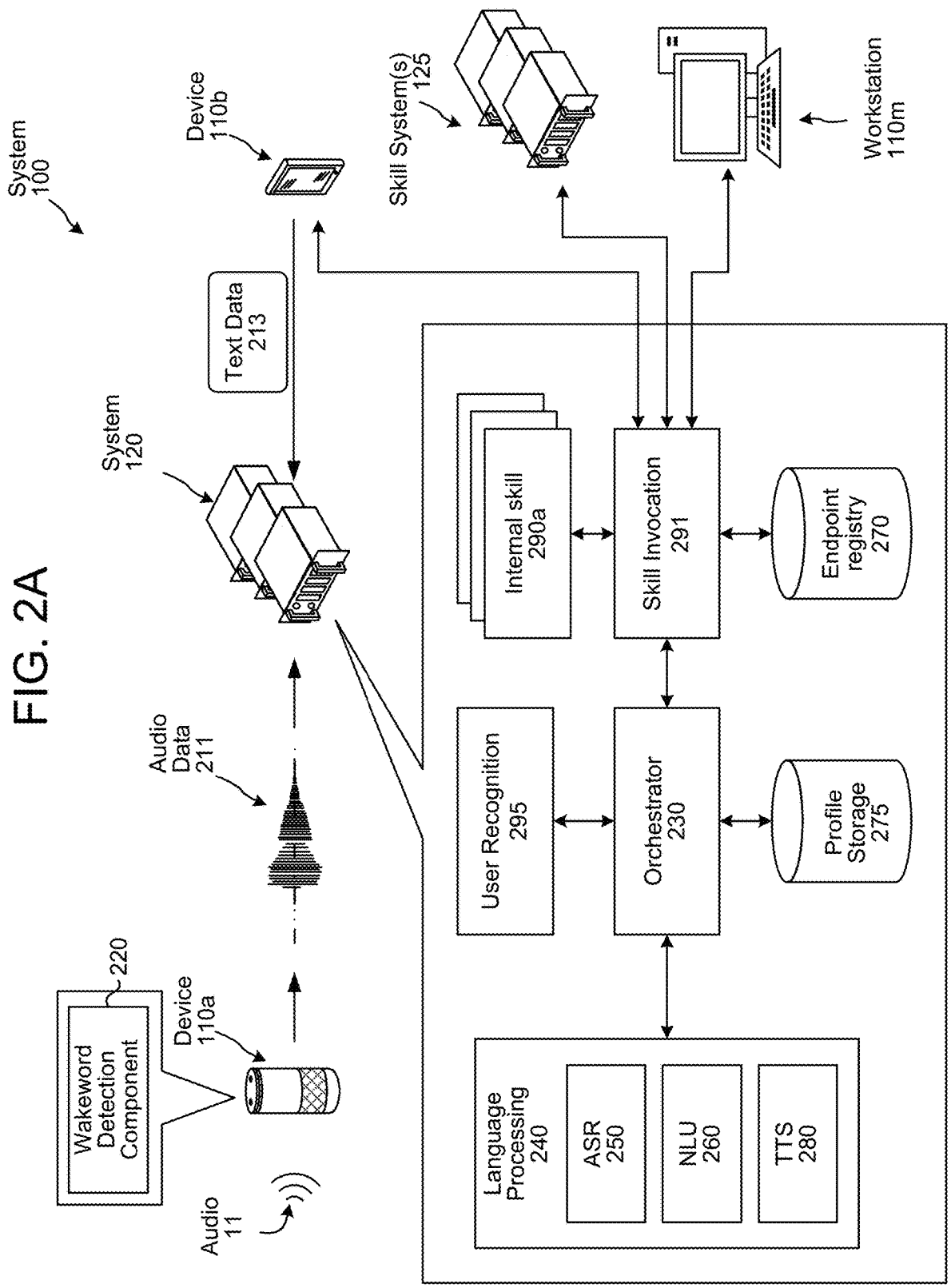

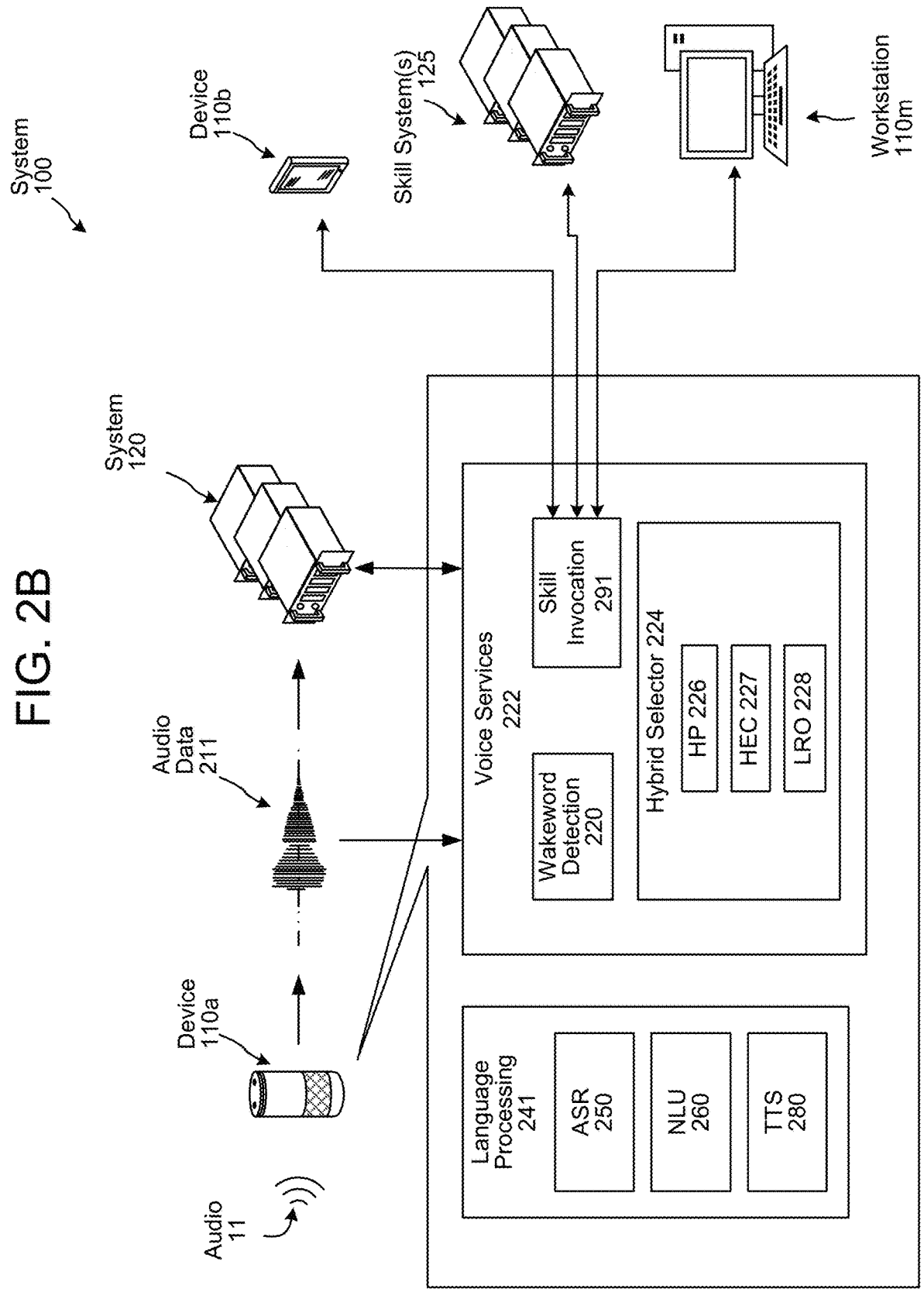

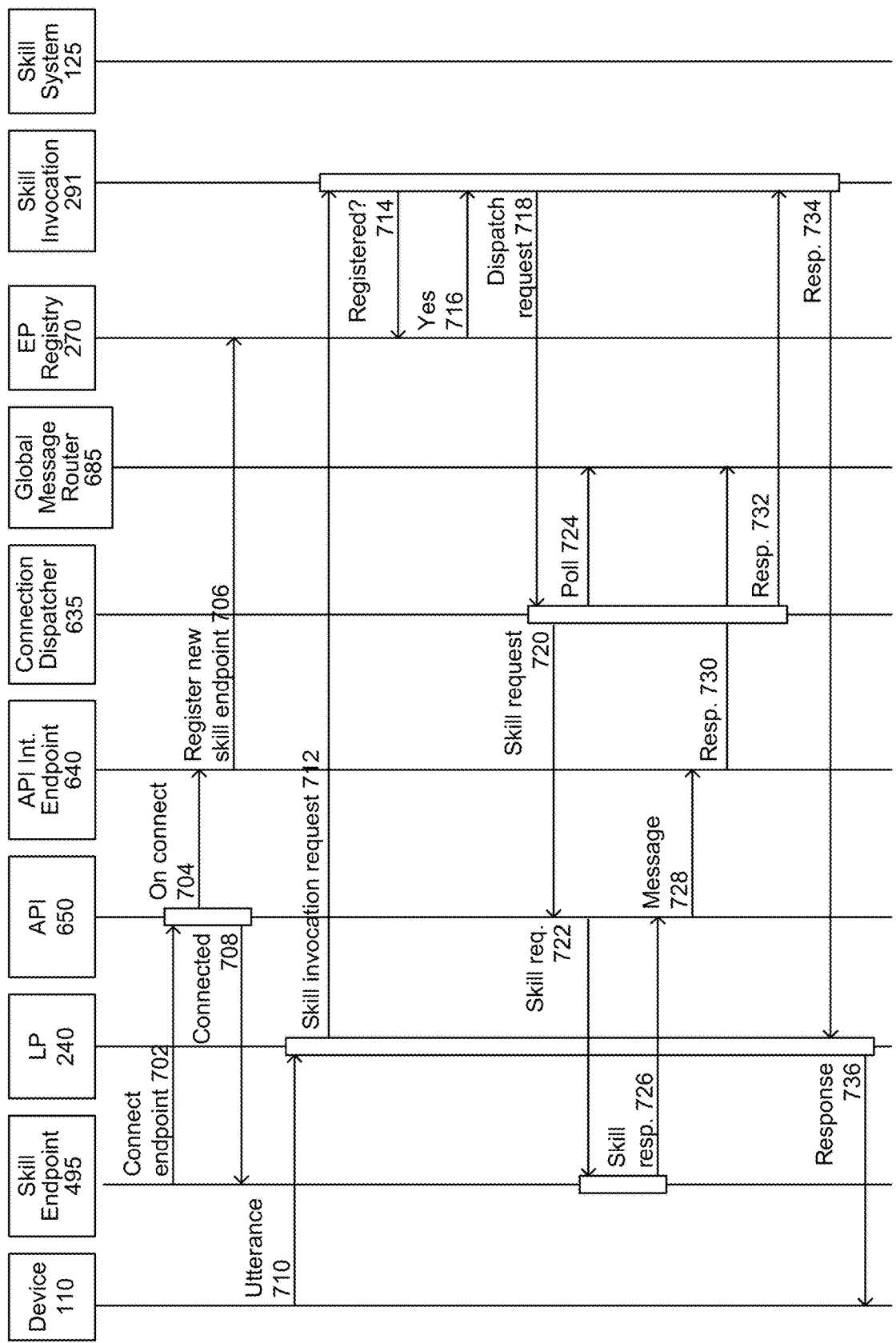

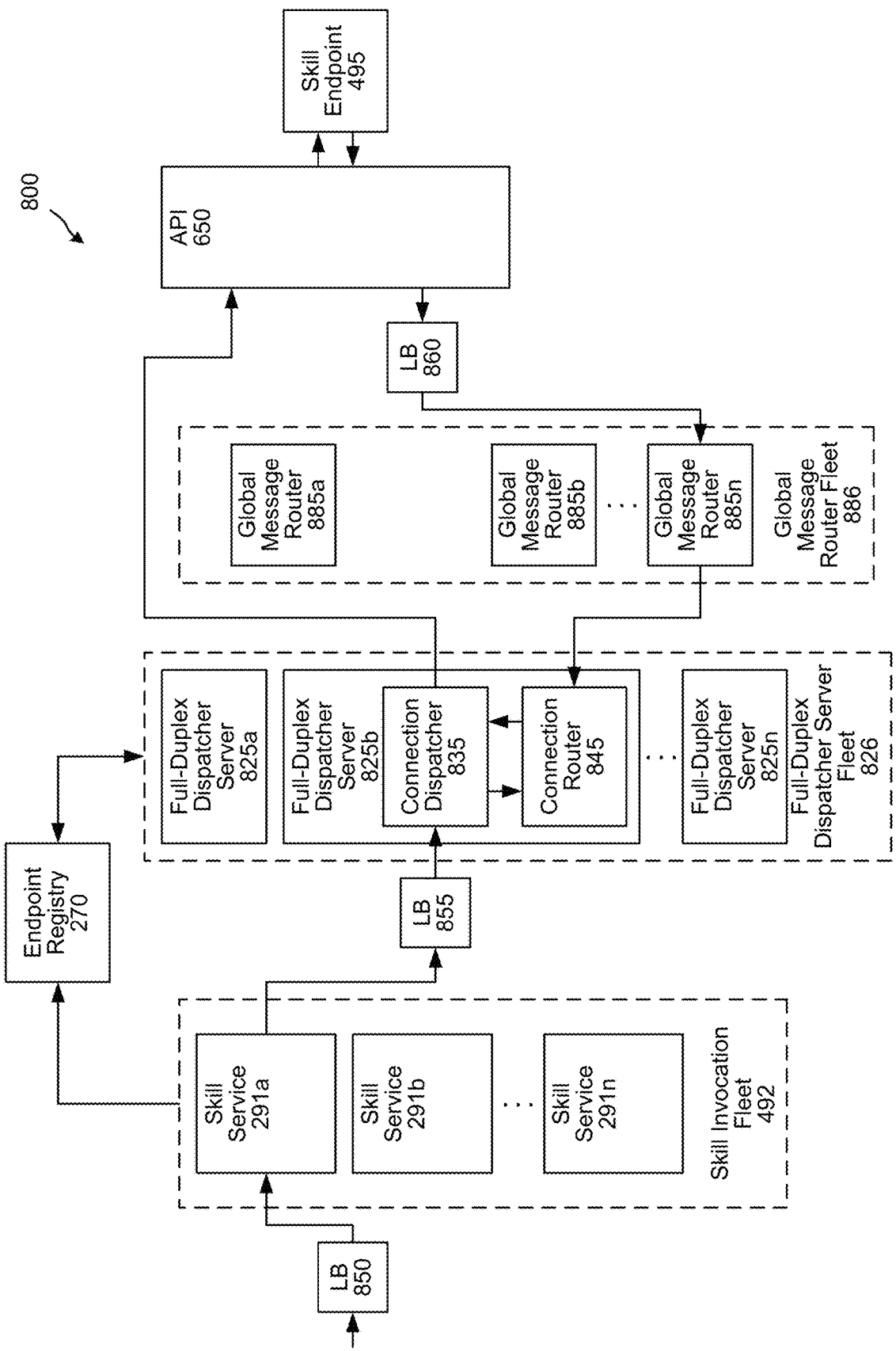

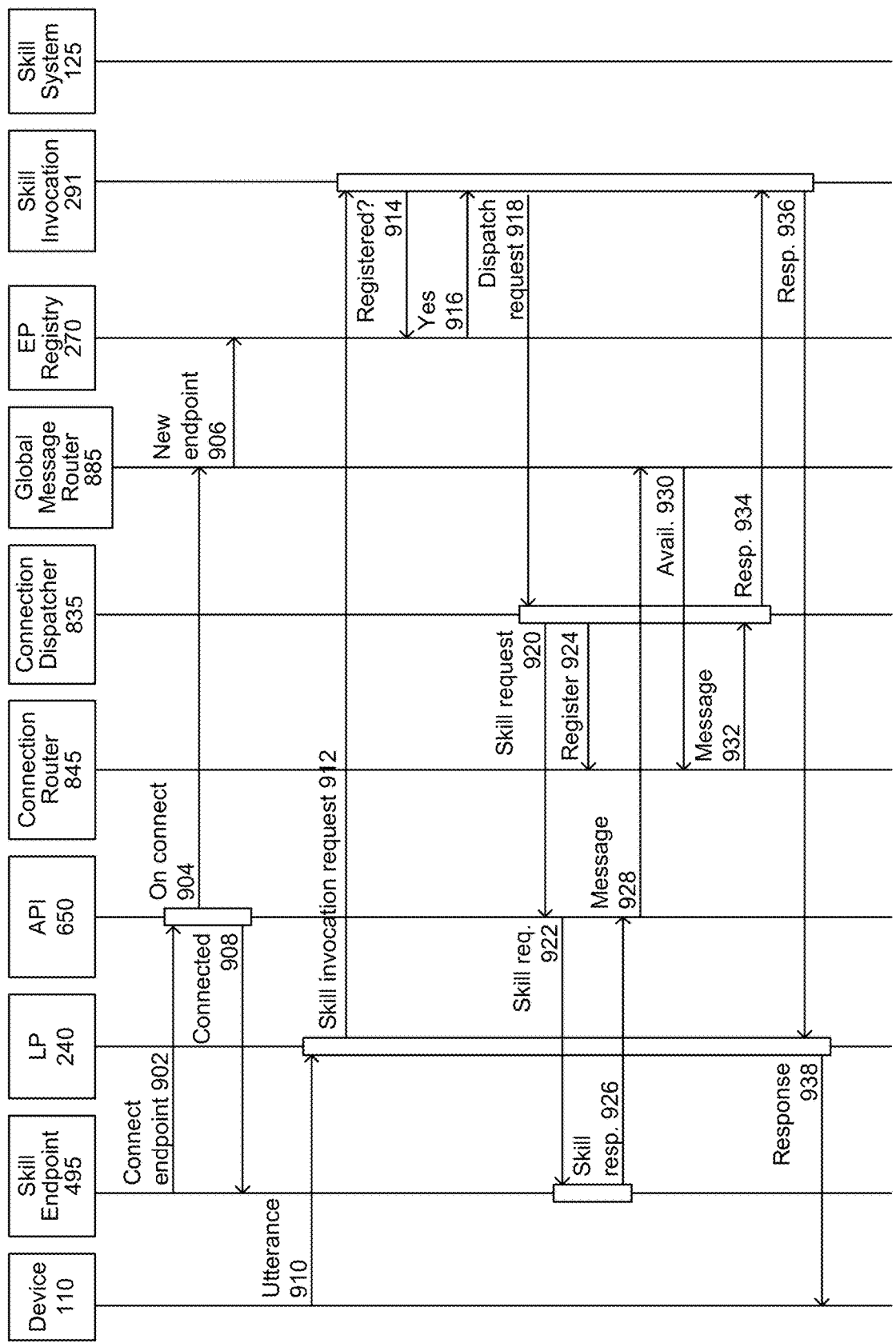

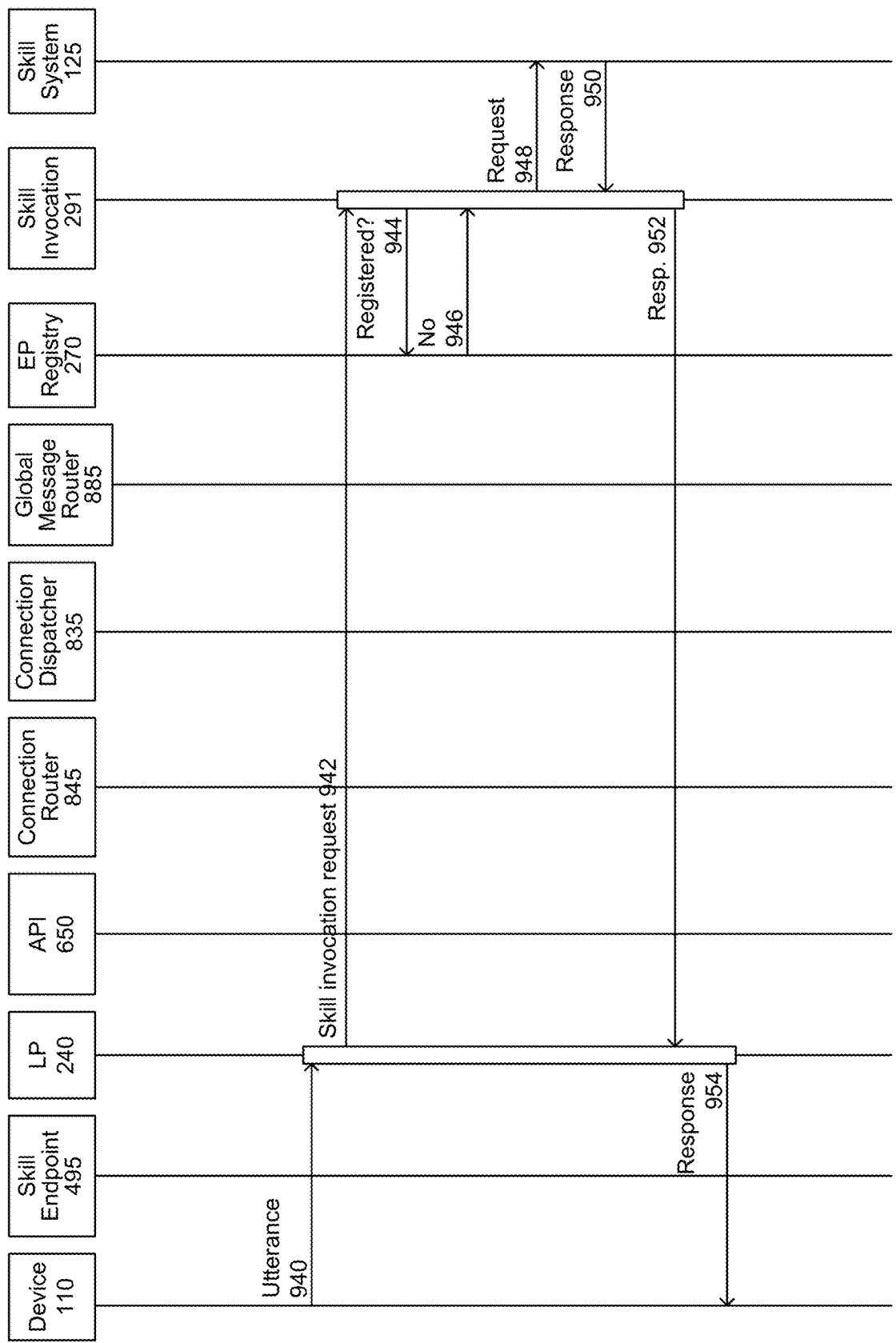

DYNAMIC SKILL ENDPOINT

BACKGROUND

Natural language processing systems have progressed to the point where humans can interact with computing devices using their voices and natural language textual input. Such systems employ techniques to identify the words spoken and written by a human user based on the various qualities of a received input data. Speech recognition combined with natural language understanding processing techniques enable speech-based user control of a computing device to perform tasks based on the user's spoken commands. Speech recognition and natural language understanding processing techniques may be referred to collectively or separately herein as natural language processing. Natural language processing may be used by computers, hand-held devices, telephone computer systems, kiosks, and a wide variety of other devices to improve human-computer interactions.

Natural language processing may involve converting a user's speech into text data which may then be provided to various text-based software applications, sometimes referred to as speechlets or skills. Skills may execute locally to the natural language processing system, either in the same hardware or within the same data center facility connected by a local area network (LAN). In some cases skills may execute on remote systems separated from the natural language processing system, with the respective may be connected via one or more third-party networks. In the latter cases, the natural language processing system typically communicates with the remote skills using Internet routable addresses.

BRIEF DESCRIPTION OF DRAWINGS

For a more complete understanding of the present disclosure, reference is now made to the following description taken in conjunction with the accompanying drawings.

FIG. 2A is a conceptual diagram of components of the system, according to embodiments of the present disclosure.

FIG. 2B is a block diagram illustrating speech processing components that may be included in a device of the system, according to embodiments of the present disclosure.

FIGS. 7A and 7B show a signal flow diagram illustrating second example processes for registering dynamic skill endpoints and invoking skills with and without registered dynamic endpoints using an API component, in accordance with embodiments of the present disclosure.

FIG. 8 illustrates a high-level view of a third example system for registering dynamic skill endpoints and invoking registered skills using an API component in conjunction with one or more global message routers, according to embodiments of the present disclosure.

FIGS. 9A and 9B show a signal flow diagram illustrating third example processes for registering dynamic skill endpoints and invoking skills with and without registered dynamic endpoints using an API component in conjunction with one or more global message routers, in accordance with embodiments of the present disclosure.

DETAILED DESCRIPTION

Figure 1A:
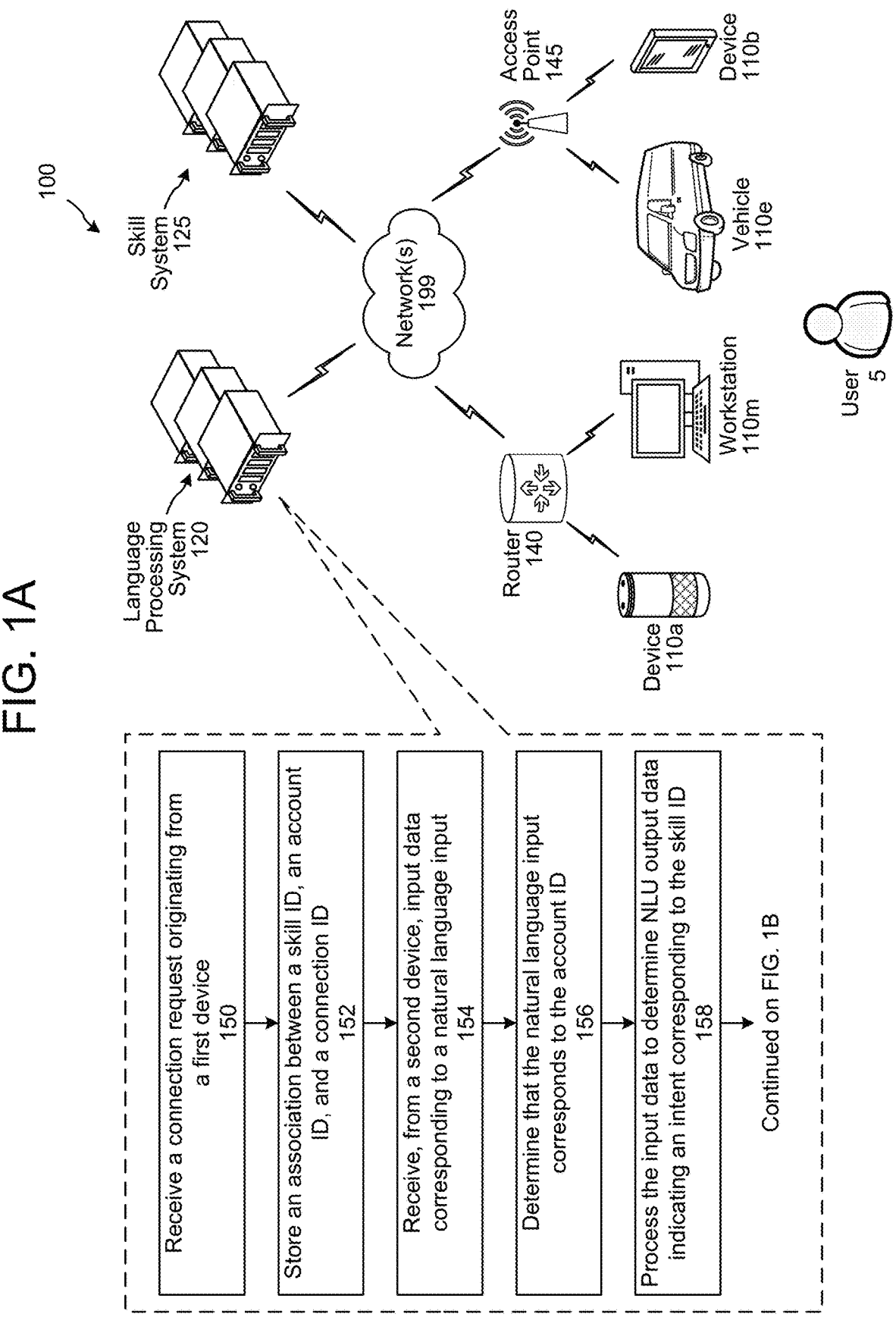
FIGS. 1A and 1B illustrate a conceptual diagram of a system configured to register dynamic skill endpoints and invoke registered skills, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause a skill or skill system to perform actions in response to natural language inputs (e.g., spoken inputs and/or typed inputs in a language spoken by humans). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As used herein, an "action" may refer to some result of a skill system's processing.

In a natural language processing (NLP) system such as Amazon's Alexa, skills are typically cloud services that implement certain functions. Whenever a user request has to be fulfilled by a skill, the NLP system can send a request to that skill's cloud service, and the skill sends a response back that the NLP system can then handle appropriately, which can involve sending some directives back to the user's device to render a response. Each skill has its cloud service's endpoint specified in its definition (sometimes called a skill manifest) in a static way; meaning, the skill has a statically defined endpoint (e.g., one or more default endpoints, for example regional endpoints for different geographic regions) for its cloud service that the NLP system can call as needed.

Such an arrangement can provide a certain amount of flexibility because skill systems can be added and removed, maintained separately from the NLP system, and hosted anywhere an Internet connection is available. For example, some skill systems may be under common control with the NLP system and perhaps share hardware resources, while other skill systems may be maintained by other parties and hosted on separate infrastructure, and reachable only via other networks such as the networks that make up the Internet. Each skill system thus functionally has an endpoint with which the NLP system can communicate via an Internet-routable address, such as an Internet Protocol (IP) address, via, for example, Hypertext Transfer Protocol Secure (HTTPS). Internet-routable addresses can include static IPv4 and IPv6 addresses. In this arrangement, the NLP system acts as the client issuing requests, and each skill system acts as a server, performing actions in response to the requests.

Because the NLP system sends requests to endpoints via HTTPS, the endpoints typically have Internet routable addresses. This can put an inherent limitation on where skill's code can run. For example, skills cannot be hosted on a user device (computer, phone, or smart-home appliance, etc.) or a device networked via a local area network (LAN), or otherwise removed from the wider Internet by a modem, router, and/or firewall. This prevents the NLP system from being able to act as a "front end" or user interface for applications running on many local devices. To illustrate, suppose a user has a smart speaker device such as an Amazon Echo. The user can interact with the smart speaker using the wakeword "Alexa" followed by a spoken command. A speech processing system can perform an action in response to the command by processing the spoken command and transmitting NLU data, such as an NLU hypothesis including an intent and one or more entities, to a skill system via an Internet routable address. The skill system can return results to Alexa for delivery to the user.

In some cases, the user may wish to request performance of an action on an application running on a local device via a spoken command to the speech processing system. For example, the user may wish to use voice commands to control a video streaming app on a smart TV, buy movie tickets via a phone app, read aloud an email on an email application, or interface with some other program or application that is not intrinsically speech enabled.

In another example, a user can use the system to interface with a vehicle such as a delivery van or truck. The vehicle can be a smart vehicle; i.e., a vehicle that can execute applications. For example, a delivery vehicle may have an integrated computing system that can execute a delivery app that monitors GPS, gas mileage, and other signals related to following a delivery route. Leveraging the speech processing system to interface with the delivery application can increase the efficiency of providing supplemental inputs from a delivery driver using speech inputs, either directly to a microphone connected to the computing system of the vehicle, or indirectly via an app on the user's personal device.

In yet another example, a skill developer may wish to troubleshoot a skill using software running locally on a workstation before deploying it to the cloud. The developer may lack the ability to provide the workstation with an Internet routable address, or to get Alexa to validate and use a particular address. This can greatly limit the developer's ability to troubleshoot a new skill or an update to an existing skill. To test the skill based on real input from Alexa, the developer may deploy the skill under test to the cloud, which increases the iteration cycle for the developer. Running the skill locally on the workstation can give the developer the ability to more easily work with code, check memory registers, etc.

This disclosure includes a system employing dynamic skill endpoints by, e.g., allowing user-personalized instances of skills to register themselves with the NLP system. The client-server relationship between the NLP system and the skill system may be reversed as the skill system now opens a persistent network connection to the NLP system. This connection enables the machine(s) running the skill system to function without an Internet routable address; the skill system can contact the NLP system, which remains at a static address, through any local routers or firewalls which may block connections initiated outside the local area network (LAN). This registration opens the connection between the skill system and the NLP system. Once the skill system is registered with the NLP system, when the NLP system receives a command and identifies an intent, the NLP system can check its registry for a skill corresponding to the intent. In some implementations, the NLP system can further determine a user profile associated with the command, and route NLU data including that intent and associated with that particular user profile to one registered skill system, while the NLP system routes NLU data including that intent for all other user profiles to a cloud-based skill system. This can allow a skill developer to locally troubleshoot a new version of a skill while the cloud-based skill continues servicing user commands. Similarly, the NLP system can handle NLU data differently depending on whether or not it has a registry entry for a particular intent associated with a particular user. For example, if a user has registered a local app such a movie app on the user's phone, the NLP system can send NLU data for the intent MOVIE to the movie app, while sending NLU data for other intents or other users elsewhere.

Figure 1B:
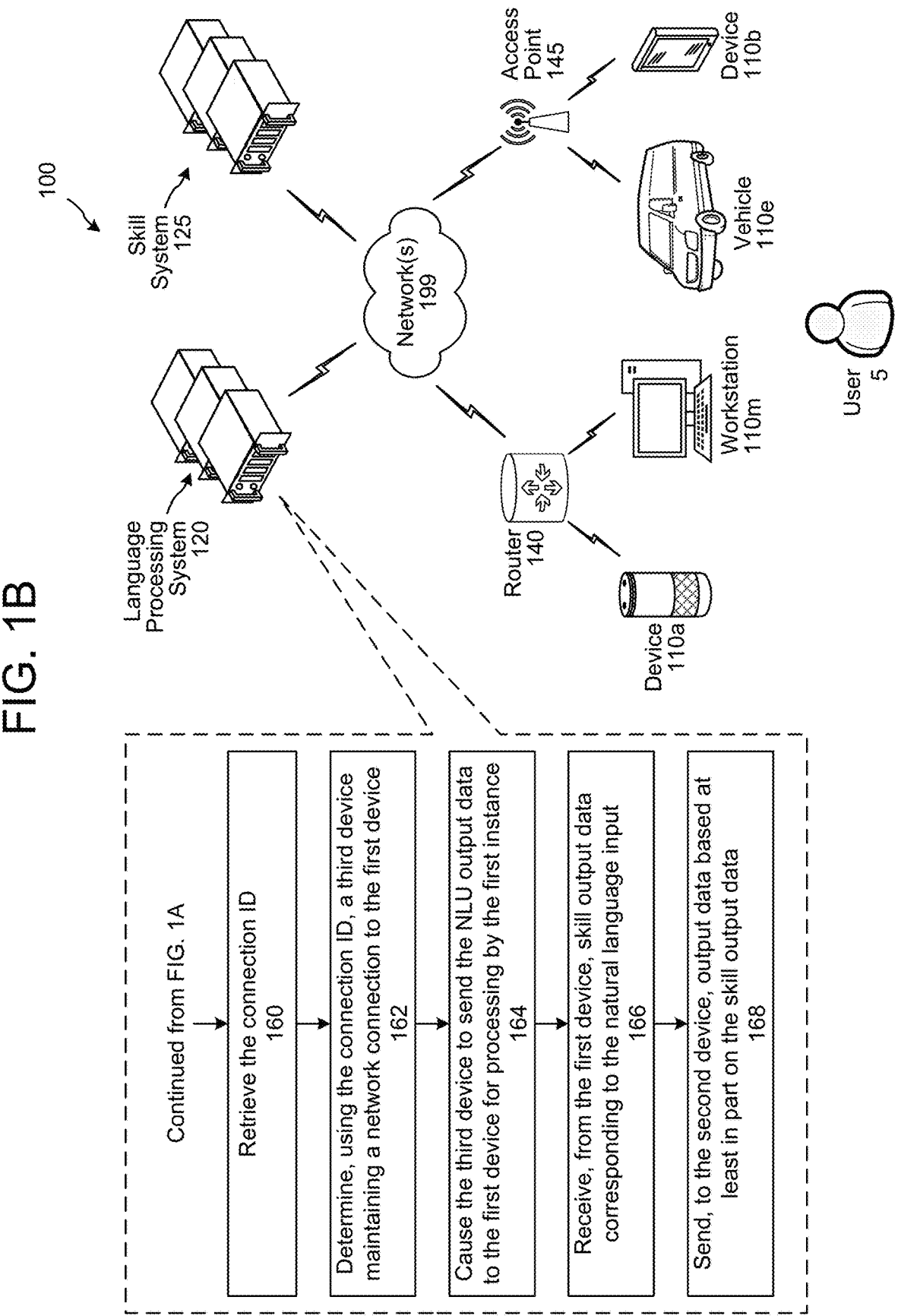

FIGS. 1A and 1B illustrate a conceptual diagram of a language processing system 120 configured to register dynamic skill endpoints and invoke registered skills, according to embodiments of the present disclosure. Although the figures and discussion of the present disclosure illustrate certain steps in a particular order, the steps described may be performed in a different order (as well as certain steps removed or added) without departing from the present disclosure. As shown in FIG. 1A, the language processing system 120 may be part of a broader system 100, which may include one or more devices such as a speech activated device 110a and a mobile device 110b (collectively "devices 110") a workstation 110m, and a vehicle 110e, one or more of which may be local to a user 5. The system 120 further includes a natural language command processing system 120 (abbreviated "system 120"), and one or more skill systems 125 connected across one or more networks 199. While the user 5 is illustrated as being a human, other types of users (e.g., computing systems) may exist. The system 120 may communicate with the skill systems 125 via HTTP or HTTPS over the network 199 via an Internet routable address. The devices 110 and the workstation 110m, however, may communicate with the system 120 via one or more intermediate access points or routers. For example, the device 110a and the workstation 110m may connect to a LAN separated from the network 199 by a router 140, which may include a firewall that can block certain network connections to computers on the LAN from being initiated from devices outside of the LAN. In another example, the device 110b and/or the vehicle 110e may have a mobile, wireless connection to the network 199 via a wireless access point 145. In each case, the devices 110, workstation 110m, and or the vehicle 110e may lack an Internet routable address. An aspect of this disclosure is enabling the user 5 to leverage the language processing system 120 to interpret natural language commands and/or requests, and forward them to an application, skill, or speechlet running on one or more of the devices 110, workstation 110m, and/or vehicle 110e. In some cases, the user 5 may provide the command to a first device 110 for executing on a second device 110; that is, the dynamic endpoint may correspond to the second device 110. In other cases, the user 5 may provide the command to the first device 110 for execution on the same first device 110; that is, the dynamic endpoint may correspond to the first device 110.

The user 5 may register a dynamic skill endpoint for a skill instance residing on a device 110 or the workstation 110m. The skill instance may alternative version or implementation of a skill having its primary or default instance hosted in the cloud; e.g., in a skill system 125. In some implementations, the skill instance may be an application executing on the device 110 or workstation 110m. In some implementations, the skill instance may be a test skill executing on the device 110 or workstation 110m for development and/or testing purposes. In some implementations, the skill instance may be a personal skill executing on a personal device 110. A personal skill may be an app registered to a particular user and configured to accept input via the system 120. A personal skill may be in contrast to a skill operating independently of an association with any particular user account. The user may provide login information to the personal skill. The login, including a username and password, may allow the skill access to data of the user stored online; for example, data regarding use of the skill or data provided by the user to the skill. In some implementations, a skill can perform personalized actions; i.e., actions that depend on an identity of, or user profile associated with, the speaker of a command. Example personalized actions may include smart home actions that may involve knowing which device types are in the user's home, knowing the user's assigned names for controllable devises (e.g., "kitchen light"), and/or drivers needed to control those particular devices (e.g., a lightbulb from one manufacturer might use a different driver or protocol than one from a different manufacturer). In some implementations, skill endpoints may be associated with other devices that host or execute skills.

The device 110a may receive audio corresponding to a spoken natural language input originating from the user 5. The device 110a may generate audio data corresponding to the audio, and may send the audio data to the system 120. The device 110a may send the audio data to the system 120 via an application that is installed on the device 110a and associated with the system 120. An example of such an application is the Amazon Alexa application that may be installed on a smart phone, tablet, or the like. Similarly, the device 110b may receive text data corresponding to a natural language input originating from the user 5, and send the text data to the system 120 (the device 110b may also receive audio, generate audio data corresponding to the audio, and send the audio data to the system 120). Examples of various devices 110 are further illustrated in FIG. 14. The system 120 may performing natural language processing on the input data to generate output data, which it can then forward to a skill instance residing in a skill system 125 for processing. In the case of a registered skill endpoint, the system 120 may forward the output data to a skill instance at a previously registered skill endpoint; for example, possibly at the device 110b or the workstation 110m.

The example process begins in FIG. 1A with step 150 and continues in FIG. 1B with step 160. The system 120 can receive a connection request originating from a first device (150). The system 120 can store an association between a skill identifier, an account identifier, and a connection identifier (152). The system 120 can receive, from a second device, input data corresponding to a natural language input (154). The system 120 can determine that the natural language input corresponds to the account identifier (156). The system 120 can process the input data to determine NLU output data indicating an intent corresponding to the skill identifier (158). The process continues on FIG. 1B. The system 120 can retrieve the connection identifier (160). The system 120 can determine, using the connection identifier, a third device maintaining a network connection to the first device (162). The system 120 can cause the third device to send the NLU output data to the first device for processing by the first instance (164). The system 120 can receive, from the first device, skill output data corresponding to the natural language input (166). The system 120 can send, to the second device, output data based at least in part on the skill output data (168).

The system 120 can receive a connection request originating from a first device (150). The system 120 may receive the connection request over one or more computer networks including the network 199. The first device may be a remote device, such as a device 110 or workstation 110m, separated from the network 199 by a router or access point. In some cases, the first device may lack an Internet routable address. The first device can host a first instance of a skill. The connection request can include an account identifier corresponding to a user or owner of the first device, or to the first device itself. The connection request can also include a skill identifier corresponding to the first instance of the skill. The system 120 can send a connection response to the first device. For example, the system 120 may include a dispatch server, and the system 120 may cause the dispatch server to send the connection response to the first device. Receipt of the connection response by the first device may establish a persistent network connection between the dispatch server and the first remote device. In some implementations, the network connection can be a WebSocket channel.

In some implementations, the system 120 can advertise a virtual internet protocol address (VIP). A VIP doesn't necessarily correspond to an actual physical network interface, but rather can be a public IP address used to receive data packets destined for multiple devices connected to a network using, for example, one-to-many network address translation. A network address translation device, such as a router, can advertise the VIP address, and route incoming data packets to different actual IP addresses. Skill endpoints attempting to register with the system 120 can send their connection requests addressed to the VIP; that is, the connection requests can include the VIP as a destination address. When the system 120 establishes the network connection between the dispatch server and first device, the local endpoint of the network connection may correspond to the VIP.

In some implementations, the system 120 can maintain an application programming interface (API) component. Skill endpoints attempting to register with the system 120 can send their connection requests to the API component, and the API component can serve as the local endpoint of the network connection thus established.

In some implementations, the system 120 can validate the connection request. The first device may provide a validation token in, or accompanying, the connection request. The system 120 may validate the token against records of valid tokens and valid account identifiers. The validation check can include, for example, checking that the skill endpoint provides a valid token proving that the connection request is coming from a valid skill workspace, and that the incoming request is coming from an account identifier (or vendor identifier) that is associated with one of the registered vendor identifiers for the skill. The system 120 can thus ensure that only developers of a skill can register a new connection to a skill endpoint for that skill.

The system 120 can store an association between a skill identifier, an account identifier, and a connection identifier (152). The system can store the identifiers in a memory such as, for example, an endpoint registry. In future operations, the system 120 may search for an association based on a skill identifier and an account identifier. If the skill identifier and the account identifier match an entry in the memory, the system 120 can determine a corresponding connection identifier. The connection identifier can correspond to, or identify, the persistent network connection. The connection identifier may identify the network connection by indicating a dispatch server of the system 120 serving as the local endpoint of the network connection (with the device 110 or workstation 110*m* hosting the skill instance serving as the remote endpoint of the network connection).

The system 120 can receive, from a second device, input data corresponding to a natural language input (154). The second device may be a voice-activated device or other device capable of receiving a natural language input and forwarding it to the system 120 for processing. The input data may correspond to a natural language input.

The system 120 can determine that the natural language input corresponds to the account identifier (156). The input data may include an account identifier corresponding to the second device or a user of the second device. The system 120 may determine the account identifier by other means, including user recognition of audio, textual, or other signals received by or from the second device as described herein.

The system 120 can process the input data to determine NLU output data indicating an intent corresponding to the skill identifier (158). The system 120 can perform automatic speech recognition (ASR) and/or natural language understanding processing on the input data to determine one or more NLU hypotheses, each including an intent and one or more entities. As the process continues, the system 120 can send the NLU output data in the form of a skill invocation request to a skill for processing.

The process continues in FIG. 1B. The system 120 can retrieve the connection identifier (160). The system 120 can identify a connection over which to forward the skill invocation request by querying the memory for an entry associating the skill identifier and the account identifier with a connection identifier. For example, the system 120 may determine that the skill identifier and the account identifier correspond to the connection identifier previously stored when the first device registered itself with the system 120.

In some cases, the system 120 may not have a stored association corresponding to the skill identifier and the account identifier. In such cases, the system 120 may send the NLU output data to a second skill instance, for example, a default skill in a skill system 125. Information for the default skill may be stored in a skill definition or skill manifest maintained by the system 120. The skill definition may include an Internet routable address for routing skill invocation requests to the second skill instance via HTTPS.

The system 120 can determine, using the connection identifier, a third device maintaining a network connection to the first device (162). Based on the connection identifier, the system can identify a third device maintaining a network connection to the first device. The third device can be a dispatch server of the system 120.

The system 120 can cause the third device to send the NLU output data to the first device for processing by the first instance (164). The third device can send the NLU output data to the first device over the network connection corresponding to the connection identifier for processing by the first skill instance. In some implementations, the first device may be connected to a LAN through a router having a firewall between a third-party network (such as the network 199) and the LAN. In some implementations, the first device may be connected to a mobile network via an access point. Thus, in some implementations, the network connection may traverse the third-party network, the router or access point, and the LAN. In some implementations, the network connection may be a WebSocket channel or the like lacking a notion of request and response. In such cases, it may be necessary to encode or otherwise include additional information in the outgoing message (e.g., the NLU output data and/or skill invocation request) so that the subsequent response can be matched with its corresponding request, particularly for the purpose of routing the response back to the third device/dispatch server. The third device may therefore, in some implementations, insert a message identifier or dispatch server identifier in the outgoing message. In some implementations, the identifier may be encrypted and included in a portion of the message data that the skill will include in the return message unaltered (for example, in a request identifier field).

The system 120 can receive, from the first device, skill output data corresponding to the natural language input (166). The skill output data can be the data generated by the skill instance in response to the NLU output data. For example, for the skill weather, the NLU output data may include an intent <GetWeather> and an entity corresponding to a zip code, and the skill output data can include a forecast for that zip code. The skill output data may be received by the third device over the network connection with the first device. The skill output data may also include or accompany a second message identifier. The system 120, including a local or global router of the system 120 depending on the particular architecture, may use the message identifier to determine which dispatch server to route the skill output data to. For example, the system 120 may determine that the second message identifier corresponds to the first message identifier, and in response proceed with routing the skill output data to the third device of the system 120.

The system 120 can send, to the second device, output data based at least in part on the skill output data (168). For example, the system 120 may return the skill output data directly to the second device or, in some implementations, the system 120 may synthesize a speech output based on the skill output data using a text to speech component, and forward output data including the speech output for output by the second device.

The system 100 may operate using various components as described in FIGS. 2A and 2B. The various components may be located on a same or different physical devices. Communication between various components of the system 100 may occur directly or across a network(s) 199. Communications between the internal components of the system 120 are described further below with reference to FIGS. 4 and 5.

A system such as the system 100 may be configured to incorporate user permissions and may only perform activities disclosed herein if approved by a user. Accordingly, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2A is a conceptual diagram of components of the system 100, according to embodiments of the present disclosure. As shown in FIG. 2A, an audio capture component (s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the system 120. An example wakeword is "Alexa." As used herein, a "wakeword" may refer to a single word or more than one consecutive words in speech. The system may also be configured to recognize different wakewords such as "Alexa" and "House" where a first wakeword may invoke different functionality/a different speech processing system from a second wakeword.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio data 211, to the system 120. The audio data 211 may include data corresponding to the wakeword, or the device 110a may remove the portion of the audio corresponding to the wakeword prior to sending the audio data 211 to the system 120.

The system 120 may include a language processing components 240. The language processing components 240 can include an automatic speech recognition (ASR) component 250 a natural language understanding (NLU) component 260, and a text-to speech (TTS) component 280. The ASR component 250 can transcribe audio data into one or more ASR hypotheses embodied in ASR output data; for example, one or more different textual or symbolic representations of the speech contained in the audio data. The ASR output data can include a ranked list of ASR hypotheses or the top-scoring ASR hypothesis when multiple ASR hypotheses are generated for a single natural language input. The ASR output data may be used by various components of the system 120 for various purposes. A top-scoring ASR hypothesis (and/or other ASR hypotheses), which includes the text data or symbolic data corresponding to the most likely transcription of the audio data 211 may be sent from the ASR component 250 to the NLU component 260.

The NLU component 260 can receive the ASR output data and interpret the ASR output data to determine one or more NLU hypotheses embodied in NLU output data; for example, NLU results data including one or more different intents and entities contained in the transcribed audio data. The NLU output data can include a ranked list of NLU hypotheses or the top-scoring NLU hypothesis when multiple NLU hypotheses are generated for a single natural language input. The NLU output data may be used by various components of the system 120 for various purposes.

A top-scoring NLU hypothesis (and/or other NLU hypotheses), which includes NLU output data such as the intent data and/or entity data corresponding to the most likely interpretation of the user input (such as represented by audio data 211 and/or text data 213) may be sent from the NLU component 260 to the orchestrator 230 for forwarding to other components of the system 120 and the system 100; for example, the skill invocation component 291 for dispatch to an internal skill 290, skill system 125, etc., for processing. Further details of the operation of the NLU component 260 are described below with reference to FIGS. 10 and 11.

The system 120 may include one or more internal skills 290a, etc. (collectively "internal skills 290" or simply "skills 290"). A skill may be software running on the system 120 that is akin to a software application running on a traditional computing device. That is, an internal skill 290 may enable the system 120 to execute user commands involving specific functionality in order to provide data or produce some other requested output. The system 120 may be configured with more than one internal skill 290. An internal skill 290 may operate in conjunction between the system 120 and other devices, such as the device 110, in order to complete certain functions. Inputs to an internal skill 290 may come from speech processing interactions or through other interactions or input sources. An internal skill 290 may include hardware, software, firmware, or the like that may be dedicated to a particular internal skill 290 or shared among different internal skills 290.

Additionally or alternatively to being implemented by the system 120 as an internal skill 290, a skill may be implemented by a skill system 125. Such may enable a skill system 125 to execute specific functionality in order to provide data or perform some other action requested by a user. For example, a weather service skill may enable the system 120 to provide weather information, a car service skill may enable the system 120 to book a trip with respect to a taxi or ride sharing service, a restaurant skill may enable the system 120 to order a pizza with respect to the restaurant's online ordering system, etc. The system 120 may communication with a skill system 125 via Hypertext Transfer Protocol (HTTP) or HTTPS over one or more computer networks such as the network 199. In some cases, communication between the system 120 and the skill system 125 occurs over one or more third-party network; that is, a computer network maintained by a provider not associated with the system 120 or the skill system 125 other than by use of the third-party network. Thus, typically communication between the system 120 and the skill system 125 requires each to have an Internet routable address for the purposes of servicing skill invocation requests.

Additionally or alternatively, a skill may be implemented by a device 110. Such may enable the device 110 to execute specific functionality in order to provide data or perform some other action requested by a user via the system 120. The device 110 can host a skill in the form of an app or application executing on the device 110. Such a device 110 can be, for example, a mobile device 110 on a mobile network or a local area network (LAN), and thus lacking an Internet routable address.

Additionally or alternatively, a skill may be implemented by a workstation 110m. Such may enable the workstation 110m to execute specific functionality in order to provide data or perform some other action requested by a user via the system 120. The workstation 110m can host a skill in the form of an app or application executing on the workstation 110m. The workstation 110m can be, for example, a developer workstation such as a desktop computer, laptop computer, or server connected to the network 199 via a mobile network or a local area network (LAN), and thus lacking an Internet routable address.

A skill may be configured to execute with respect to NLU output data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill may operate in conjunction between the system 120 and other devices, such as the device 110, in order to complete certain functions. Inputs to a skill may come from speech processing interactions or through other interactions or input sources.

A skill may be associated with a domain. A non-limiting list of illustrative domains includes a smart home domain, a music domain, a video domain, a flash briefing domain, a shopping domain, and/or a custom domain (e.g., skills not associated with any pre-configured domain).

The skills 290, skill systems 125, devices 110, or workstations 110m may each host or otherwise execute instances of same or different skills. In some cases, a single skill—for example, a music skill—may have instances executing on more than one of the skills 290, skill systems 125, devices 110, or workstations 110m. For example, a skill system 125 may host a default instance of a skill while a workstation 110m hosts personal instance of a skill. The personal instance of a skill may be a skill instance under development or test on a machine local to and/or operated by a skill developer. In another example, an internal skill 290 may host a default instance of a skill while the device 110b hosts a personal instance of the skill in the form of an app or application executing on the device 110b.

Unless expressly stated otherwise, reference herein to a "skill" may include a skill 290 operated by the system 120, by a skill system 125, by a device 110, or by a workstation 110m. Moreover, the functionality described herein as a skill may be referred to using many different terms, such as an action, bot, app, application, or the like.

The system 120 may include a user recognition component 295 that recognizes one or more users associated with data input to the natural language command processing system 120.

The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the natural language command processing system 120 in correlation with a user input, to stored biometric data of users. The user recognition component 295 may additionally or alternatively perform user recognition by comparing image data (e.g., including a representation of at least a feature of a user), received by the natural language command processing system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language user input.

The user recognition component 295 determines whether a user input originated from a particular user. For example, a user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill 290, as well as processing performed by other components of the natural language command processing system 120 and/or other systems.

In some implementations, however, 295 may be turned off, inactive, or otherwise not engaged to perform user recognition. In such cases, the natural language processing system may assign input audio data to a default account, or a user or group account associated with the device 110, or otherwise determine a user/group account to which to assign incoming data.

The natural language command processing system 120 may include profile storage 275. The profile storage 275 may include a variety of information related to individual users, groups of users, devices, etc. that interact with the natural language command processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 275 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language command processing system 120 with permission to allow the skill to execute with respect to the user's inputs. If a user does not enable a skill, the natural language command processing system 120 may not permit the skill to execute with respect to the user's inputs.

The profile storage 275 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 275 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

In some implementations, the user recognition component 295 can associate a particular device 110 or workstation 110m to a particular end user (or device) profile in the profile storage 275. In some implementations, the system 120 can leverage the user recognition component 295 to determine a profile associated with a skill invocation request. The skill invocation component can use an account identifier associated with the profile, along with a skill identifier, to retrieve a connection identifier associated with a dynamic skill endpoint from the endpoint registry 270. This can allow the skill invocation component to route skill invocation requests for a certain skill and associated with a certain profile to a dynamic skill endpoint of, for example, a personal skill instance, while routing skill invocation requests associated with other profiles and/or skill to a usual or default skill instance on a skill system 125. These and other operations of the skill invocation component are described further below.

The system 120 may include one or more skill invocation components 291 and an endpoint registry 270. The skill invocation component can receive NLU results or output data and forward them to an appropriate skill endpoint associated with, for example, an internal skill 290, a skill system 125, a device 110, a workstation 110m, or any other device, machine, or system capable of hosting or executing a skill. Each skill has its endpoint defined in its definition (sometimes called a skill manifest). The skill invocation component can select a skill or skill instance based on an intent indicated in the NLU results data. In some implementations, the skill invocation component can retrieve a skill endpoint from the endpoint registry 270.

The endpoint registry 270 can include a mapping service with an application programming interface (API) or other interface that allows the skill invocation component to get information regarding a particular skill endpoint for a given account identifier. The endpoint registry 270 can respond to a query from the skill invocation component by indicating a dispatch server that is maintaining a network connection to a skill endpoint associated with that account identifier. In some implementations, another component of the system 120 can assign a connection identifier (or channel identifier) to each new connection established based on a connection request received from a remote device. A mapping in such implementations may provide a connection identifier for a given skill identifier and account identifier. If the endpoint registry 270 does not have an association corresponding to the query from the skill invocation component, the skill invocation component may forward the skill invocation request to a default endpoint for the intent. The default endpoint can be listed in the skill definition. In some implementations, skill definitions may reside in the endpoint registry 270. In some implementations, the skill invocation component or system 120 may maintain skill definitions separately from the endpoint registry 270. Additional operations of the skill invocation component and endpoint registry 270 are described further below with reference to FIGS. 4 through 9.

Figure 3A:
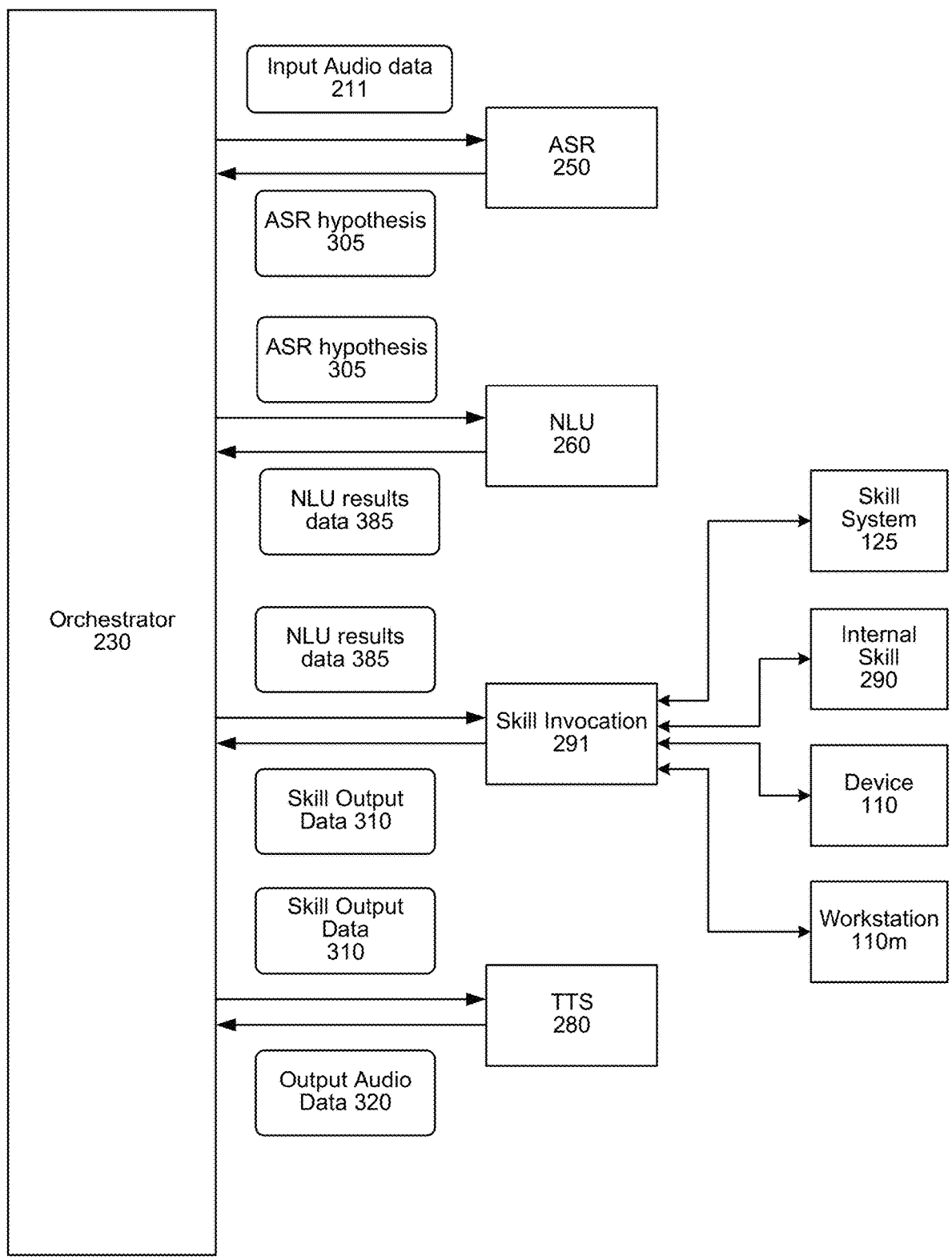
FIG. 3A is a conceptual diagram illustrating how a natural language input may be processed at runtime using dynamic skill endpoints, according to embodiments of the present disclosure.

The system 120 may include an orchestrator 230 configured to receive the audio data 211 (and optionally an account identifier corresponding to the device 110a) from the device 110a. The orchestrator 230 may include memory and logic that enables the orchestrator 230 to transmit various pieces and forms of data to various components of the system 100, as well as perform other operations. For example, as shown in FIG. 3A discussed in more detail below, the orchestrator 230 may send the audio data 211 to an ASR component 250 (discussed further below) and an NLU component 260 (conceptually illustrated in FIGS. 10 and 11, and discussed below). The orchestrator 230 may receive text or symbolic data from the ASR component 250 and forward them to the NLU component 260. The orchestrator 230 may receive the NLU results data from the NLU component 260 and forward them to a skill invocation component 291. The skill invocation component 291 can forward the NLU results data to a skill endpoint. The system 100 can include various skill endpoints including endpoints associated with one or more internal skills 290, skill systems 125, devices 110, or workstations 110m. The skill invocation component 291 may receive output data from the skill 290, skill system 125, device 110, or workstation 110m, and return it to the orchestrator 230. The orchestrator 230 cause performance of one or more actions in response to the output data. In some implementations, the orchestrator 230 can forward the output data to the TTS component 280 for generating a spoken-word response to the input audio data 211. The orchestrator 230 may receive output audio data 320 from the TTS component 280, and may transmit the output audio data back to the device 110a for output to the user 5.

The system 120 may include a TTS component 280. The TTS component 280 may generate audio data (e.g., synthesized speech) from text data using one or more different methods. Text data input to the TTS component 280 may come from a skill 290, a skill system 125, the orchestrator 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

In certain embodiments of the system speech processing may be performed not only at system 120 but also on device 110a (or 110b or other devices 110). Such on-device speech processing may occur separately from or in addition to speech processing performed on system 120. In certain embodiments both device 110 and system 120 may perform speech processing and the results of each processing may be evaluated to determine which speech processing results to use to actually execute a command. Such a combined system may be referred to as hybrid speech processing.

FIG. 2B is a block diagram illustrating a system 100 including a speech interface device 110 that is capable of performing speech processing. Optimizing the utilization of on-device computing resources (e.g., processing resources, etc.) of the speech interface device 110 can a reduce latency so that the user experience with the speech interface device 110 is not negatively impacted by local processing tasks taking too long.

The speech interface device 110 may be located within an environment to provide various capabilities to a user 5, when the user 5 is also in the environment. The environment in which the speech interface device 110 is located may be a home or other premises, an automobile, or any similar environment. Such an environment may include other devices including additional speech interface devices, such as other speech interface devices, and/or second devices (e.g., Internet of Things (IoT) devices and/or smart home devices like thermostats, lights, refrigerators, ovens, etc.) that may be controllable by speech interface devices, such as the speech interface device 110. When acting as a hub, the speech interface device 110 may be configured to connect a plurality of devices in an environment and control communications among them, thereby serving as a place of convergence where data arrives from one or more devices, and from which data is sent to one or more devices.

Figure 14:
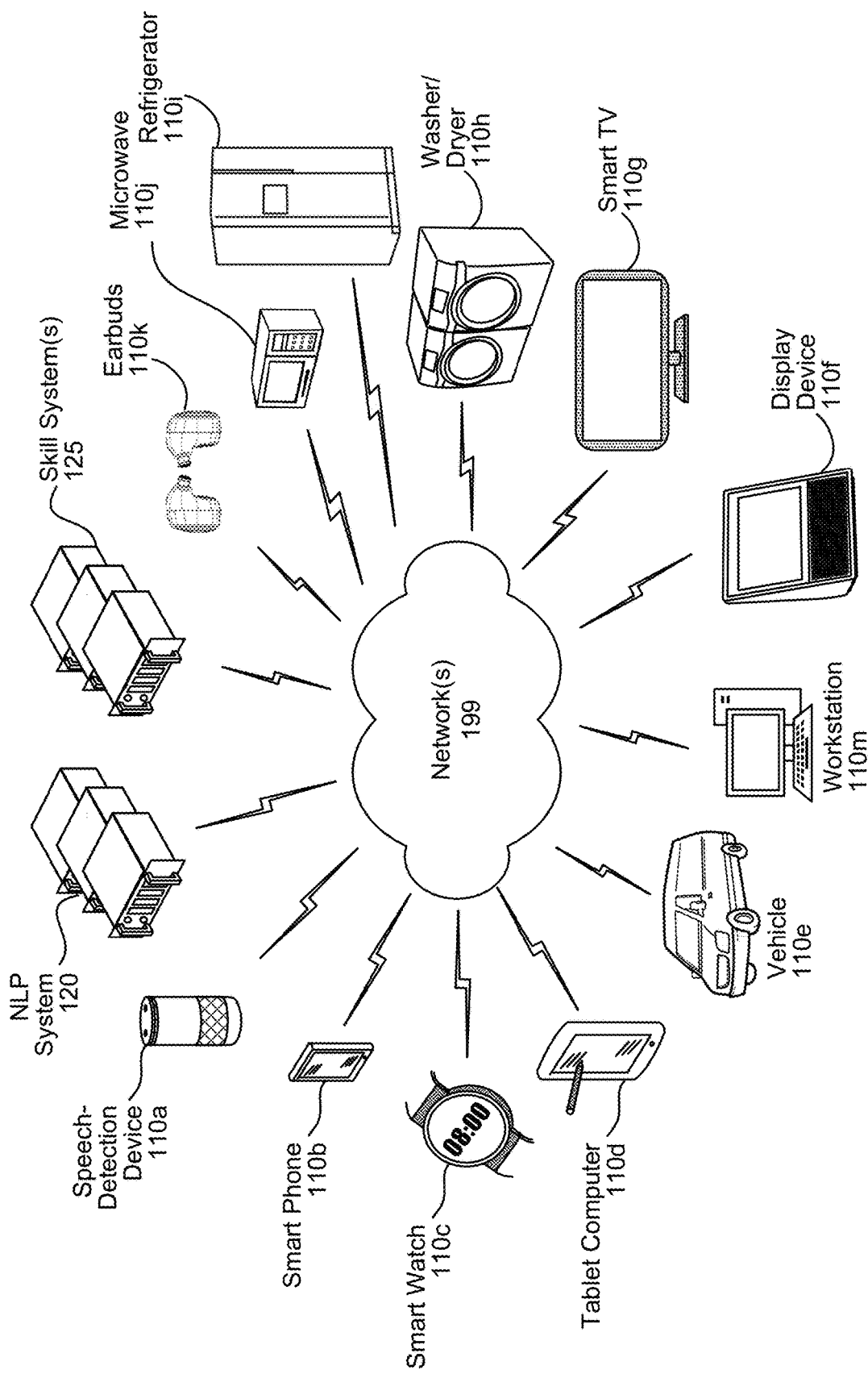
FIG. 14 illustrates an example of a computer network for use with the overall system, according to embodiments of the present disclosure.

The speech interface device 110 may be configured to respond to user speech by controlling second devices that are collocated in the environment with the speech interface device 110, such as by sending a command to a second device via an input/output communications interface 1202 (e.g., a short range radio), the command instructing an operation to be performed at the second device, for example a device such as those shown in FIG. 14 or other device (e.g., to turn on/off a light in the environment). In addition to using a built-in microphone(s) to capture utterances and convert them into digital audio data, the speech interface device 110 may additionally, or alternatively, receive audio data (e.g., via the I/O communications interface 1202) from another speech interface device in the environment, such as when the other speech interface device captures an utterance from the user 5 and sends the audio data to the speech interface device 110. This may occur in situations where the other speech interface device is closer to the user 5 (for example, earbuds 110k) and would like to leverage the "hybrid" capabilities of the speech interface device 110.

The speech interface device 110 may operate in conjunction with and/or under the control of a remote, network-based or network-accessible control system 120. The remote system 120 may, in some instances be part of a network-accessible computing platform that is maintained and accessible via a network 199 such as wide area network. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices of different users. The wide area network 199 is representative of any type of public or private, wide-area network, such as the Internet, which extends beyond the environment of the speech interface device 110. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

As noted, the speech interface device 110 may be configured to compare the audio data 211 to stored models used to detect a wakeword (e.g., "Alexa") that indicates to the speech interface device 110 that the audio data 211 is to be processed for determining a local NLU result (e.g., slot data that corresponds to a named entity, label data, and/or intent data, etc.). In some embodiments, the hybrid request selector 224 (further discussed below) may send the audio data 211 to a wakeword detection component 220, which determines whether a wakeword is detected in the audio data 211, and, if a wakeword is detected, this indication may be provided to the hybrid request selector 224 so that the hybrid request selector 224 can proceed with routing the audio data 211 to the remote speech processing system 120 while the local speech processing component 241 processes the audio data 211 in parallel. If a wakeword is not detected in the audio data 211, this indication may be provided to the hybrid request selector 224 so that the hybrid request selector 224 can refrain from sending the audio data 211 to the remote speech processing system 120, and to prevent the local speech processing component 241 from further processing the audio data 211, which does not include the wakeword. The audio data 211 can be discarded in this situation.

The device 110 may also conduct its own speech processing using on-device speech processing components 241, such as ASR 250 and NLU 260, similar to the manner discussed above and below for FIGS. 10 and 11 with regard to system 120. The device 110 may also have internally included or otherwise accessible other components (not shown) such as applications (akin to skills 290) or other components capable of executing commands based on NLU results or other results determined by the device 110, user recognition component, user profile storage, or other components.

The on-device speech processing components, however, may not necessarily have the same capabilities as the speech processing components of the system 120. For example, the on-device speech processing components may be more particularly configured to handle local-type speech commands, such as those controlling devices or components at a user's home. In such circumstances the on-device speech processing may be able to more quickly interpret and execute a smart-home command, for example, than processing that involves system 120. If a device 110 attempts to process a command for which the on-device speech processing components are not necessarily best suited, the speech processing results obtained by the device 110 may indicate a low confidence or other metric indicating that the processing by the device 110 may not be as accurate as the processing done by the system 120.

A hybrid request selector 224 (or, hybrid request selector component 224) of the speech interface device 110 is shown as including a hybrid proxy (HP) 226 (or, hybrid proxy (HP) subcomponent 226), among other subcomponents. The HP 226 can be implemented as a layer within the voice services component 222 and may be configured to proxy traffic to/from the remote system 120. For example, the HP 226 may be configured to send messages to/from a hybrid execution controller (HEC) 227 (or, hybrid execution controller (HEC) subcomponent 227) of the hybrid request selector 224. For instance, command/directive data received from the remote system 120 can be sent to the HEC 227 using the HP 226. The HP 226 may also be configured to allow audio data 211 to pass through to the remote speech processing system 120 while also receiving (e.g., intercepting) this audio data 211 and sending the received audio data to the HEC 227.

On-device language processing component 241 (sometimes referred to as a "speech processing component," or a "spoken language understanding (SLU) component") is configured to process audio data 211 representing user speech. In some embodiments, the hybrid request selector 224 may further include a local request orchestrator (LRO) 228 (or, local request orchestrator (LRO) subcomponent) of the hybrid request selector 224. The LRO 228 is configured to notify the local speech processing component 241 about the availability of new audio data 211 that represents user speech, and to otherwise initiate the operations of the local speech processing component 241 when new audio data 211 becomes available. In general, the hybrid request selector 224 may control the execution of the local speech processing component 241, such as by sending "execute" and "terminate" events/instructions to the local speech processing component 241. An "execute" event may instruct the local speech processing component 241 to continue any suspended execution based on audio data 211 (e.g., by instructing the local speech processing component 241 to execute on a previously-determined intent in order to generate a directive). Meanwhile, a "terminate" event may instruct the local speech processing component 241 to terminate further execution based on the audio data 211, such as when the speech interface device 110 receives directive data from the remote system 120 and chooses to use that remotely-generated directive data.

Thus when audio data 211 is received by the voice services component 222, the HP 226 may allow the audio data 211 to pass through to the remote speech processing system 120 and the HP 226 may also input the audio data 211 to the on-device speech processing component 241 by routing the audio data 211 through the HEC 227 of the hybrid request selector 224, whereby the LRO 228 notifies the local speech processing component 241 of the incoming audio data 211. At this point, the hybrid request selector 224 may wait for response data from either or both of the remote system 120 or the local speech processing component 241.

The local speech processing component 241 is configured to receive the audio data 211 from the hybrid request selector 224 as input, to recognize speech in the audio data 211, to determine user intent from the recognized speech, and to determine how to act on the user intent by generating NLU results data which may include directive data (e.g., data instructing a component to perform an action). Such NLU results data may take a form similar to that as determined by the NLU operations by the system 120. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local speech processing component 241 (and/or the remote speech processing system 120) may be formatted using Java, such as JavaScript syntax, or JavaScript-based syntax. This may include formatting the directive using JSON. In some embodiments, a device-generated directive may be serialized, much like how remotely-generated directives are serialized for transmission in data packets over the network 199. In other embodiments, a device-generated directive is formatted as a programmatic API call with a same logical operation as a remotely-generated directive. In other words, a device-generated directive may mimic remotely-generated directives by using a same, or a similar, format as the remotely-generated directive.

NLU results as determined by the device 110 and/or the system 120 may include data indicating a confidence and/or estimated accuracy of the results. Such data may come in the form of a numeric score but may also come in different forms such as an indicator of Low, Medium, or High, a ranking, or other data. The confidence data may be set to a similar scale so that confidence data for one set of NLU results (e.g., NLU result data from device 110) may be evaluated with regard to confidence data for another set of results (e.g., NLU result data from system 120).

Thus an NLU result may be selected as a candidate NLU result usable to respond to the user speech, and the local speech processing component 241 may send local response data to the hybrid request selector 224, such as a "ReadyToExecute" response, which can indicate that the local speech processing component 241 has recognized an intent. In cases where the NLU component 260 fails to recognize an intent, the local speech processing component 241 may communicate response data to the hybrid request selector 224 that it is ready to communicate failure. The hybrid request selector 224 may then determine whether to use directive data from the local speech processing component 241 to respond to the user speech, or whether to use directive data received from the remote system 120, assuming a remote response is even received (e.g., when the speech interface device 110 is able to access the remote speech processing system 120 over the wide area network 199). (Further illustration of selection of device 110 determined NLU results data versus system 120 determined NLU results data is discussed below in reference to FIG. 3B.) In any case, directive data is processed to cause the speech interface device 110 to perform an action, such as outputting audio via one or more speaker(s), controlling one or more second devices in the environment, etc. In the example of FIG. 2B, the action may be to send a control signal(s) via the communications interface 1202 to one or more lights in the kitchen, which may be configured to receive the control signal and perform the "turn off" operation to turn off the kitchen lights.

The device 110 as part of its voice services component 222 (or otherwise available) may also have a skill invocation 291 component that may work similarly to the skill invocation component described with regard to system 120. The device may also have, or otherwise be in communication with, endpoint registry (not shown in FIG. 2B). This may enable the device to route data to skill endpoints similarly to the routing discussed herein (for example as discussed below in reference to FIGS. 4A-9B).

FIG. 3A is a conceptual diagram illustrating how a natural language input may be processed at runtime using dynamic skill endpoints, according to embodiments of the present disclosure. FIG. 3A illustrates the operation of the system 120 from the prospective of an orchestrator 230. After the orchestrator 230 receives the audio data 211 corresponding to a spoken natural language input, the orchestrator 230 may send the audio data 211 to the ASR component 250. The ASR component 250 can transcribe audio data into one or more ASR hypotheses embodied in ASR output data 305 (e.g., one or more different textual or symbolic representations of the speech contained in the audio data). The ASR output data 305 can include a ranked list of ASR hypotheses or the top-scoring ASR hypothesis when multiple ASR hypotheses are generated for a single natural language input. A top-scoring ASR hypothesis (and/or other ASR hypotheses), which includes the text or symbolic data corresponding to the most likely transcription of the audio data 211 may be sent from the ASR component 250 to the orchestrator 230. The orchestrator 230 may send the ASR output data 305 to the NLU component 260.

The NLU component 260 can receive the ASR output data 305. The NLU component 260 can interpret the ASR output data 305 to determine one or more NLU hypotheses embodied in NLU results data 385 (e.g., one or more different intents and entities contained in the transcription of the audio data 211). The NLU results data 385 can include a ranked list of NLU hypotheses or the top-scoring NLU hypothesis when multiple NLU hypotheses are generated for a single natural language input. A top-scoring NLU hypothesis (and/or other NLU hypotheses), which includes the intent and entity data corresponding to the most likely interpretation of the audio data 211 may be sent from the NLU component 260 to the orchestrator 230. Further details of the operation of the NLU component 260 are described below with reference to FIGS. 10 and 11.

The orchestrator 230 may send the NLU results data 385 to a skill invocation component 291 for processing. The skill invocation component can forward the NLU results data 385 to a skill or skill instance according to an intent indicated by the NLU results data. The skill invocation component may route the NLU result data 385 to a skill endpoint associated with a skill instance based on associations saved in the endpoint registry 270; or, in absence of a relevant association in the endpoint registry 270, to a default endpoint for the skill as set forth in the skill definition. The skill may process the NLU results data 385 and return skill output data 310 to the skill invocation component, which can forward the skill output data 310 to the orchestrator 230. The orchestrator 230 may forward the skill output data 310 directly to the device 110, to another skill, or to the text-to-speech (TTS) component 280. The TTS component 280 may generate a spoken-word response to the user based on the skill output data 310, and provide it back to the orchestrator 230 in the form of output audio data 320, which may be forwarded to the device 110 for output.

Figure 3B:
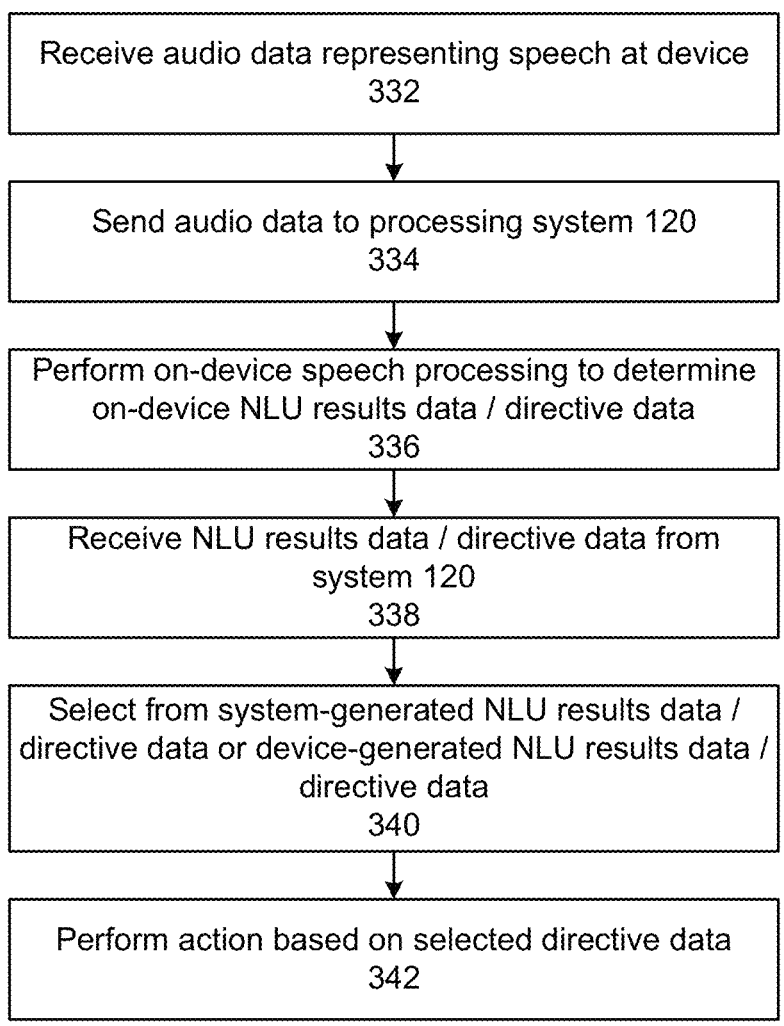
FIG. 3B is a diagram illustrating how a device may select between NLU results determined by the device and determined by the system according to embodiments of the present disclosure.

FIG. 3B is a diagram illustrating how a device may select between NLU results determined by the device and determined by the system according to embodiments of the present disclosure. The device 110 may receive/determine (332) audio data representing speech. The device 110 may send (334) audio data representing the speech to processing system 120. The device 110 may also perform (336) on-device speech processing to determine on-device NLU results data/directive data. The device 110 may receive (338) NLU results data/directive data from the system 120. The device 110 may select (340) from the system-generated NLU results data/directive data or the device-generated NLU results data/directive data. The device 110 may perform the selection by comparing confidence data of the respective NLU results data and selecting the NLU results data with the highest reflected confidence and/or accuracy. The device 110 may also check to see if the confidence of the device-generated NLU results data exceeds a threshold and if it does, select the device-generated NLU results data and if not select the system-generated NLU results data. The device 110 may also determine an intent represented in the NLU results data and if a certain intent is represented, select a particular set of NLU results data (for example, certain intents may result in selection of device-generated NLU results while other intents may result in selection of system-generated NLU results). Other selection criteria may also be used. The device 110 may them perform an action (342) based on the selected NLU results data.

For example if the selected NLU results data includes instructions to turn off the kitchen lights, the device 110 may perform an action, via the communications interface 1202, a command to a second device(s) (e.g., smart kitchen lights) collocated in the environment with the device 110, causing the second device(s) to "turn off" In another example, if the NLU results data indicates an action that requires operation of a remote skill 290 the device may indicate to the system 120 (or other component) to send a directive to the appropriate skill 290 to perform the action.

In another example, the device 110 may select (34) the system-generated NLU results data however may determine that the device 110 is acting as the skill endpoint (as described herein) for the skill indicated in the selected system-generated NLU results data. For example, the device 110 may process the system-generated NLU results data and determine, using a skill invocation component 291 and/or other components/operations that the device 110 is acting as (or is in communication with) the appropriate skill endpoint that goes with the system-generated NLU results data. The device 110 may then cause the command represented by the system-generated NLU results data to be executed, either by some component/software of device 110 or by some other component in communication with device 110.

Figure 4A:
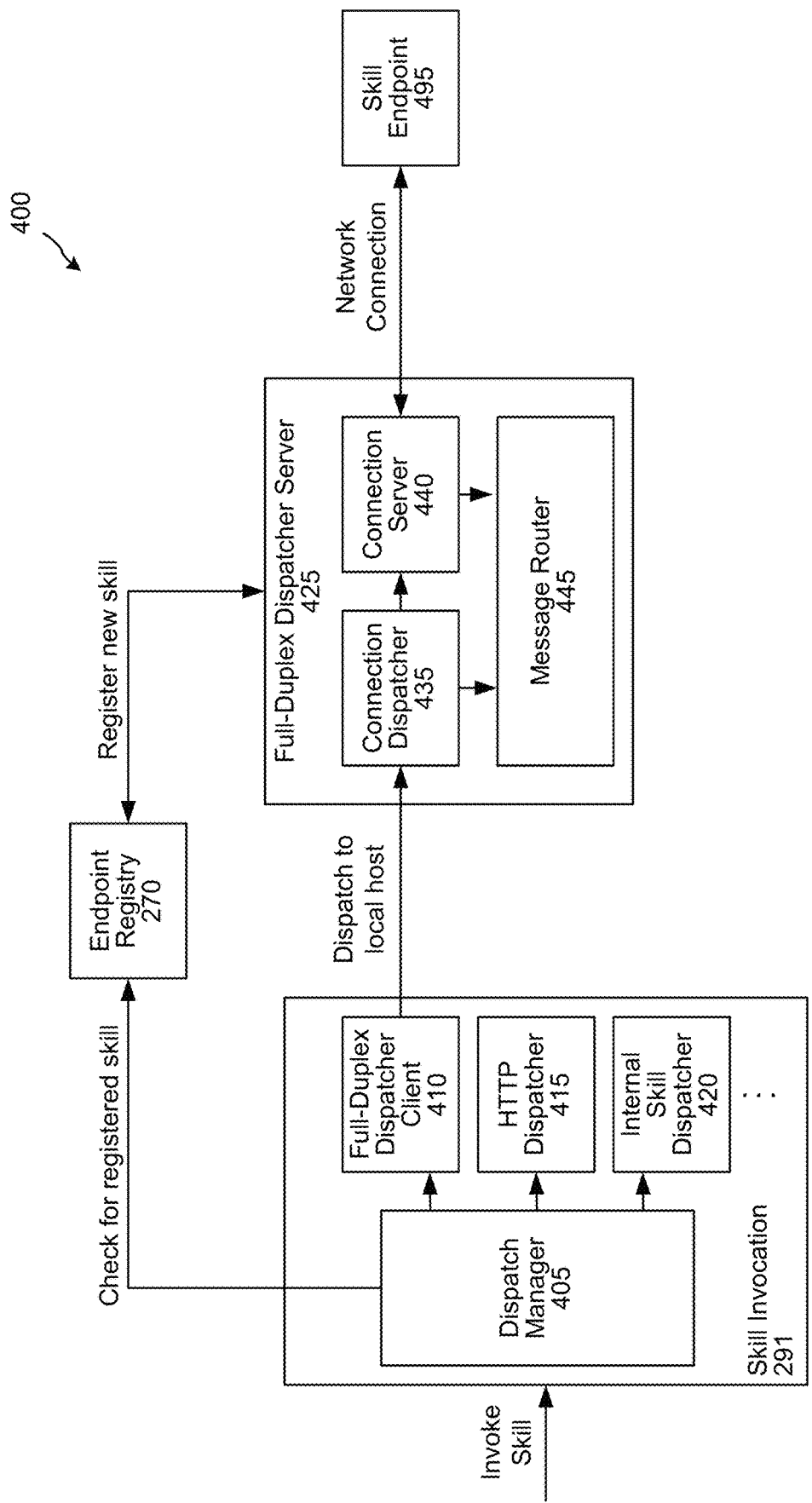
FIG. 4A illustrates a high-level view of a first example system for registering dynamic skill endpoints and invoking registered skills, according to embodiments of the present disclosure.

FIG. 4A illustrates a high-level view of a first example system 400 for registering dynamic skill endpoints and invoking registered skills, according to embodiments of the present disclosure. The system 400 includes a skill invocation component 291, in communication with an endpoint registry 270 and one or more dispatcher servers 425 full-duplex dispatcher servers 425 (abbreviated as "dispatcher server 425"). At a high level, the skill invocation component receives skill invocation requests and dispatches them to the dispatcher server 425 for forwarding to a skill endpoint 495 via a long-lived network connection established between the skill endpoint 495 and the dispatcher server 425. The skill endpoint 495 can be associated with a device 110 or a workstation 110m or any other device, machine, or system hosting a skill instance and registering with the system 400. In some cases, the skill endpoint 495 may correspond to a same device 110 that receives natural language inputs. In other cases, the skill endpoint 495 may correspond to a device, machine, or system other than the device 110 that receives natural language inputs; for example, a second device 110, a workstation 110m, a vehicle 110e, or a skill system 125.

The skill invocation component includes a dispatch manager 405, which can forward a skill invocation request to one of a full-duplex dispatcher client 410 full-duplex dispatcher client 410, a HTTP/HTTPS dispatcher 415, an internal skill dispatcher 420, etc., depending on a registry in the endpoint registry 270 or a skill definition associated with a skill indicated in the skill invocation request. For example, the skill invocation request may include a skill identifier and an account identifier. The dispatch manager 405 can query the endpoint registry 270 for a connection identifier associated with the skill identifier and account identifier. If the endpoint registry 270 has such an association, it can return the connection identifier, which the system 400 can use to route the skill invocation request to, for example, the full-duplex dispatcher client 410, dispatcher server 425, and skill endpoint 495. If the endpoint registry 270 does not have a connection identifier associated with the skill identifier and account identifier, it can either return a default endpoint for the skill indicated by the skill invocation request, or a null response that tells the dispatch manager 405 to retrieve the default endpoint from elsewhere. The dispatch manager 405 can then route the skill invocation request through, for example, the HTTP dispatcher 415, and on to a different skill endpoint such as one of the skill systems 125. If the skill definition indicates a skill endpoint associated with an internal skill 290, the dispatch manager 405 can route the skill invocation request to the internal skill 290 via the internal skill dispatcher 420. The skill invocation component may have fewer or additional dispatchers depending on the particular configuration of the system 400, and based on the different protocols used to communicate with the various implementations of skills.

The full-duplex dispatcher client 410 can be a thin remote client for the one or more dispatcher servers 425. Within the skill invocation component, the full-duplex dispatcher client 410 can have the same interface as other dispatchers (e.g., the HTTP dispatcher 415 and the internal skill dispatcher 420); however, instead of sending skill invocation requests directly to skills the way the other dispatchers do, the full-duplex dispatcher client 410 can act as a proxy to the dispatcher servers 425, which do the actual dispatching of the skill invocation requests to the skills. Because the network connections to skill endpoints 495 in the system 400 are at the dispatcher server 425 level, meaning individual dispatcher servers 425 have network connections to different endpoints, the skill invocation request has to be routed directly to that dispatcher server 425. Thus there may not be a load balancer in front of the dispatcher servers 425, and requests from full-duplex dispatcher client 410 can go directly to the individual dispatcher server 425 as determined from the connection identifier returned from the endpoint registry 270.

In some implementations, multiple Skill invocation components and dispatcher servers 425 can be arranged as fleets for distributed handling larger volumes of skill invocation requests. An example fleet implementation of the system 400 is described below with reference to the system 401 shown in FIG. 4B.

Each dispatcher server 425 has several components configured to receive new connection requests from skill endpoints and maintain open connections, register those connections, route skill invocation requests to the skill endpoints, and correlate skill output data received from skill endpoints with the corresponding skill invocation request. The dispatcher server 425 includes a connection dispatcher 435, a connection server 440, and a message router 445.

The connection dispatcher 435 can serve as the entry point for receiving skill invocation request from the skill invocation component for routing to a dynamic skill endpoint over a network connection. In some implementations, the network connection can be a long-lived or persistent network connection such as WebSocket channel. Network connections can be maintained at the host level of the system 400. In some implementations requests from skill invocation component can go directly to the dispatcher server 425—that is, not through a load-balancer, but instead directly to a specific dispatcher server 425 that has an active connection to the skill specified by the skill invocation request. The endpoint registry 270 can contain the metadata (e.g., associations) for each active connection to allow the dispatch manager 405 and the full-duplex dispatcher client 410 in the in the skill invocation component to figure out which specific dispatcher server 425 to route the skill invocation request to. The connection dispatcher 435 can listen for incoming skill invocation requests coming from skill invocation component, and route each incoming skill invocation request over the appropriate network connection based on the connection identifier stored in the endpoint registry 270. Following dispatch of the skill invocation request to the specified skill endpoint 495, the connection dispatcher 435 can query the message router 445 for a response to that request. This call to the message router 445 for a response can be a blocking call that waits until a corresponding response message is available from the skill 495.

The connection server 440 can be the entry point for skills to register dynamic endpoints to establish network connections. Each dispatcher server 425 can run a connection server which, in some implementations, can reside behind a load-balancer and a TCP virtual IP address (VIP). The VIP can be externally exposed to allow skills to direct connection requests to it; that is, the connection requests can indicate the VIP as a destination address. The connection server 440 can listen for incoming connection requests for new connections from skill endpoints 495, and validate incoming connection requests to check if the request has valid authorization to be able to register a network connection for the skill. The validation check can include checking that the skill endpoint 495 provides a valid token proving that the connection request is coming from a valid skill workspace, and that the incoming request is coming from a vendor identifier (or account identifier) that is one of the registered vendor identifiers for the skill (meaning only developers of a skill can register a new connection). The connection server 440 can notify the endpoint registry 270 of any new connections from skills (storing associations between account identifiers, skill identifiers, and connection identifiers in the endpoint registry 270), notify the endpoint registry 270 whenever a network connection is disconnected, and send incoming messages (skill output data) to the message router 445 so they can be correlated to the corresponding pending skill invocation requests.

The message router 445 can manage the relationship between messages sent (skill invocation requests) and received (skill output data) to/from skill endpoints 495. Some connection protocols, for example, WebSockets, provide bi-directional full-duplex channels that do not include a notion of request/response information in the protocol definition. Thus, the relationship of requests and responses between outgoing and incoming messages can be managed by the message router 445. In an example operation, the connection dispatcher 435 can notify the message router 445 for each skill invocation request sent to skill endpoints 495, and the message router 445 can keep track of all such pending requests. When a message is received by the connection server 440 on any of the existing channels, the connection server 440 can notify the message router 445, which can then use a message identifier in the message to correlate it to its corresponding pending request. The message router 445 can thus keep track of all the pending skill invocation requests, and map incoming notifications from connection server 440 for incoming messages on channels to corresponding pending skill invocation requests from the connection dispatcher 435.

In some implementations, multiple Skill invocation components and dispatcher servers 425 can be arranged as fleets for distributed handling larger volumes of skill invocation requests. An example fleet implementation of the system 400 is described below with reference to FIG. 4B.

Figure 4B:
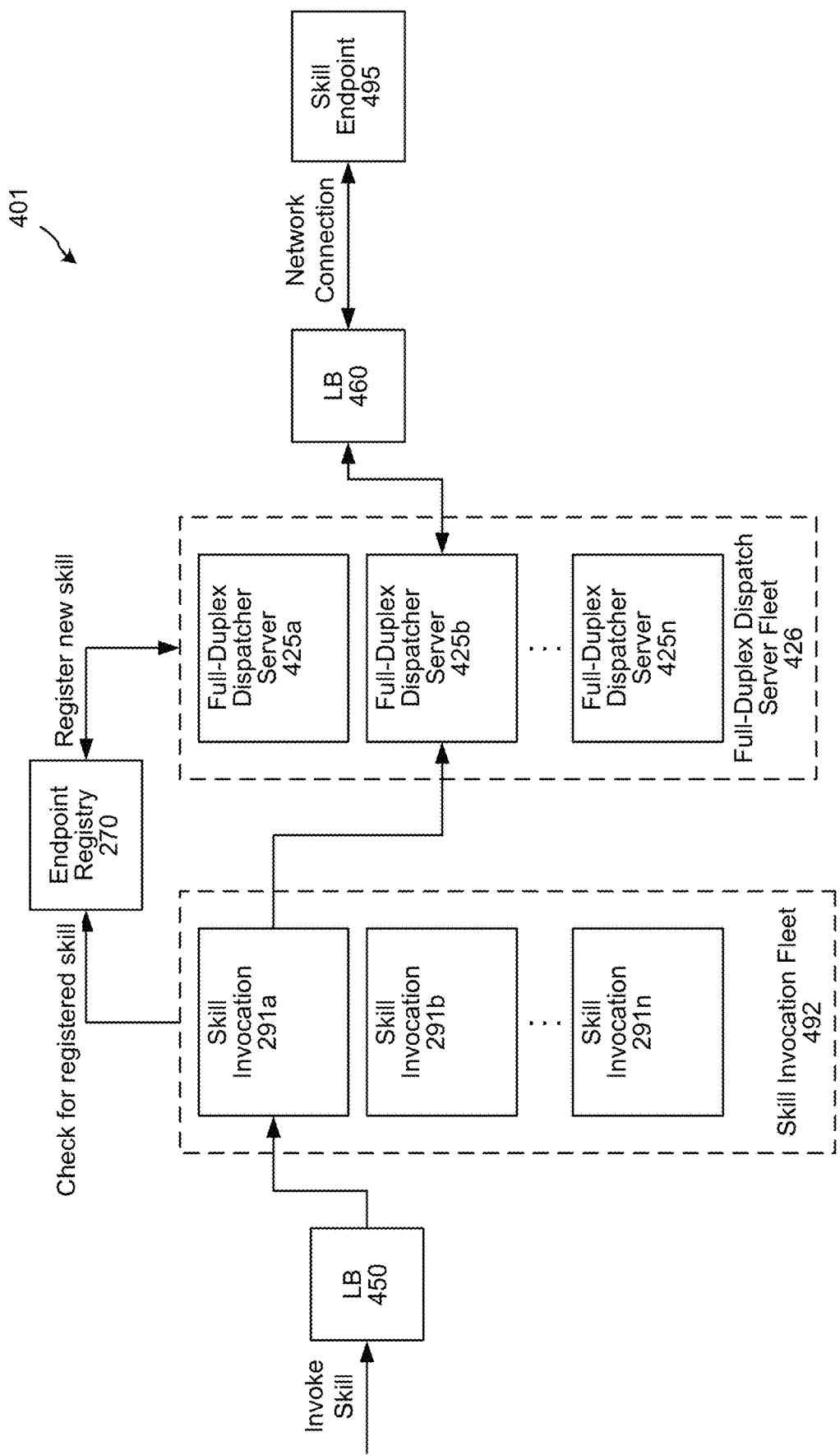
FIG. 4B illustrates a high-level view of an example system having multiple instances of components similar to those shown in FIG. 4A arranged into fleets with load balancing, according to embodiments of the present disclosure.

FIG. 4B illustrates a high-level view of a system 401 having multiple instances of components similar to those shown in FIG. 4A arranged into fleets with load balancing, according to embodiments of the present disclosure. The system 401 includes a skill invocation fleet 492 receiving skill invocation requests via a first load balancer 450, and a full-duplex dispatcher server fleet 426 receiving connection requests from skill endpoints 495 via a second load balancer 460. The skill invocation fleet 492 includes a plurality of skill invocation components, 291b, through 291n (collectively "Skill invocation components"). Each skill invocation component in the skill invocation fleet 492 can be similar or equivalent to the skill invocation component previously described. The dispatcher server fleet 426 can include dispatcher servers 425a, 425b, through 425n (collectively "dispatcher servers 425"). Each dispatcher server 425 can be similar or equivalent to the dispatcher server 425 previously described.

In the system 401, the load balancer 450 can receive skill invocation requests from the orchestrator 230 or other component of the system 120 and route them to a skill invocation component for processing. Determining an endpoint to route a particular skill invocation request to can be performed in the same manner as described previously with reference to FIG. 4A in that the skill invocation component checks the endpoint registry 270 for a connection identifier associated with the account identifier and skill identifier in the skill invocation request. If an association is found, the skill invocation component can dispatch the skill invocation request to the particular local host—in this case dispatcher server 425b—maintaining a connection to the specified endpoint.

The system 401 can receive connection requests from skill endpoints 495 via the load balancer 460, and the load balancer 460 can route the connection requests to a particular dispatcher server 425. If the dispatcher server 425 establishes a connection with the skill endpoint, the dispatcher server 425 will store the connection identifier in the endpoint registry to enable the skill invocation fleet 492 to route any requests for the skill instance at the skill endpoint 495 to the appropriate dispatcher server 425; that is, the particular dispatcher server 425 maintaining a connection to the skill endpoint 495.

The systems 400 and 401 are advantageous in that they provide low level control of network connections to endpoints; for example, setting parameters such as maximum connection idle time allowed, maximum connection duration allowed, number of concurrent connections allowed, etc.

Example operations of the systems 400, 401, and their various components are described below with reference to FIGS. 5A and 5B.

Figure 5A:
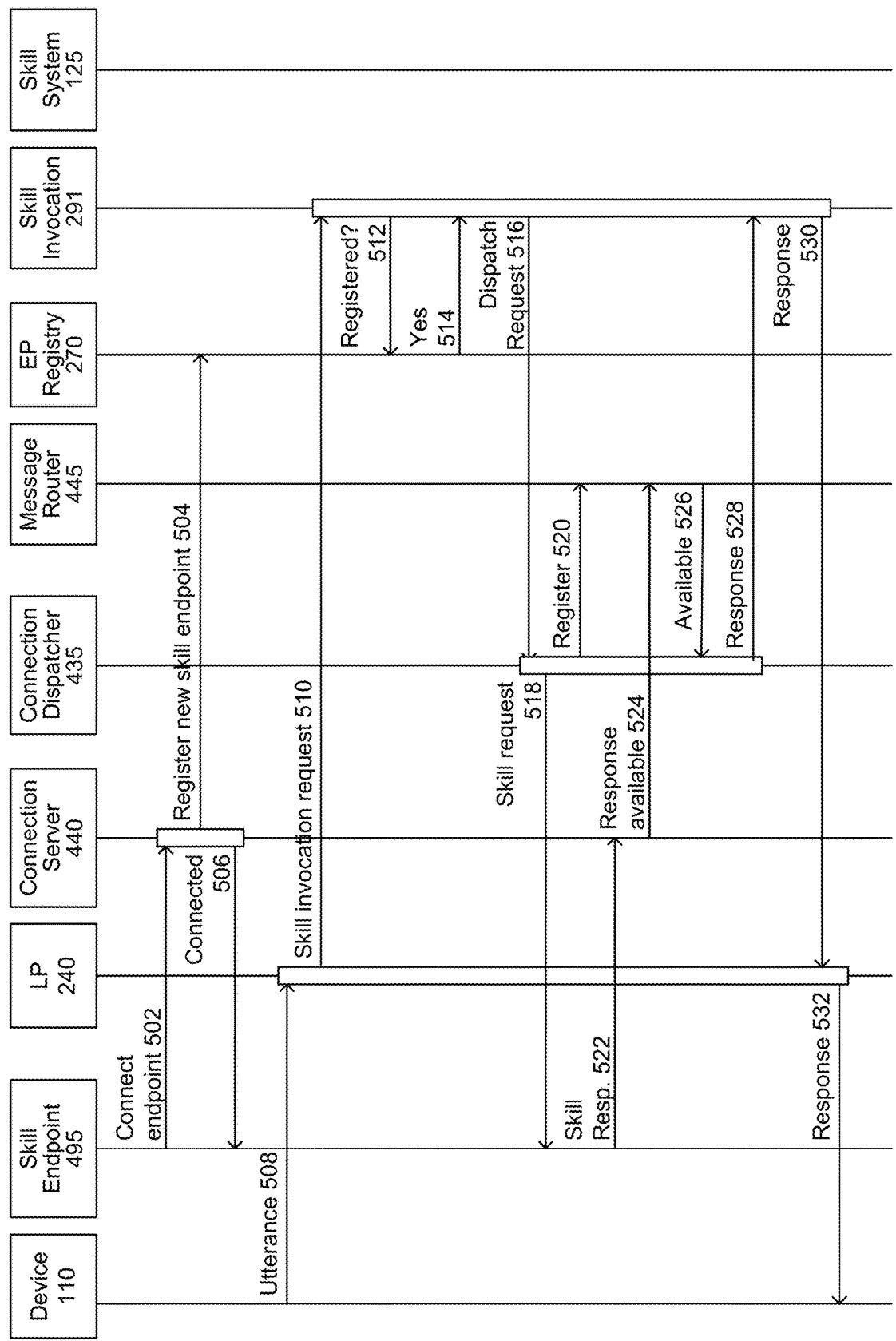
FIGS. 5A and 5B show a signal flow diagram illustrating first example processes for registering dynamic skill endpoints and invoking skills with and without registered dynamic endpoints, in accordance with embodiments of the present disclosure.
Figure 5B:
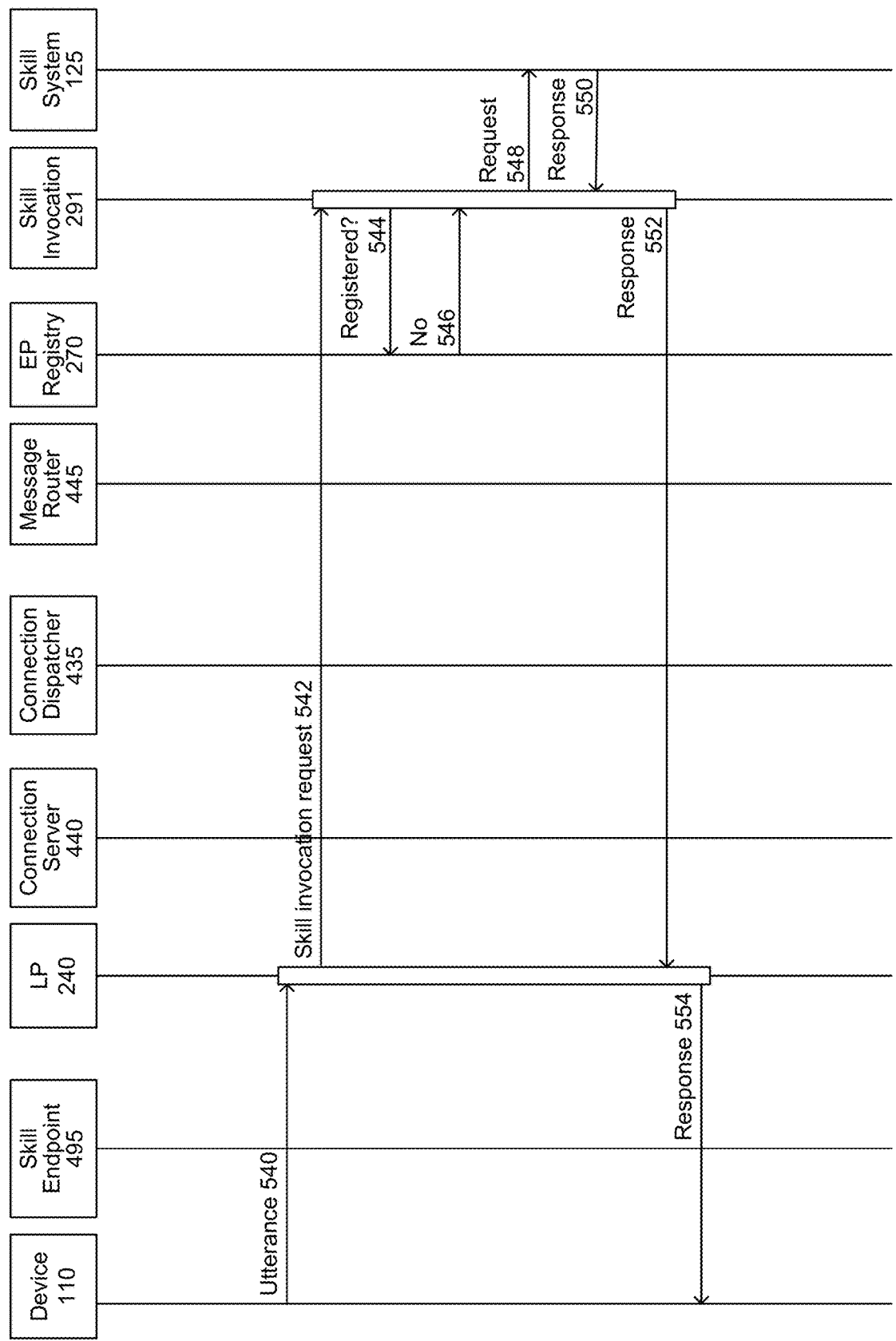

FIGS. 5A and 5B show a signal flow diagram illustrating first example processes for registering dynamic skill endpoints and invoking skills with and without registered dynamic endpoints, in accordance with embodiments of the present disclosure. The signal flow diagram illustrates operations between a test device 110, a skill endpoint 495 (representing, for example, a workstation hosting an instance of a skill under test, or a personal device hosting a personal instance of a skill), language processing (LP) components 240, a connection server 440, a connection dispatcher 435, a message router 445, an endpoint (EP) registry 270, a skill invocation component, and a skill system 125 (representing, for example, a default or public instance of a skill). FIG. 5A illustrates example operations for registering a dynamic skill endpoint and routing a skill invocation request to the registered dynamic skill endpoint. FIG. 5B illustrates example operations for routing a skill invocation request to a default skill instance hosted by a skill system if the skill invocation request does not meet the conditions for routing to the dynamic skill endpoint. In some cases, the skill endpoint 495 may correspond to a same device 110 that receives natural language inputs. In other cases, the skill endpoint 495 may correspond to a device, machine, or system other than the device 110 that receives natural language inputs; for example, a second device 110, a workstation 110m, a vehicle 110e, or a skill system 125.

The skill endpoint 495 sends a connection request (502) to the connection server 440, which can be configured to receive all incoming messages to the system 120 from dynamic skill endpoints. The connection server 440 registers a new skill endpoint (504) with the endpoint registry 270. The connection server 440 can complete a connection handshake (506) with the skill endpoint 495. The network connection between the skill endpoint 495 and the system 120 is thus established.

The test device 110 sends input data corresponding to an utterance or other natural language input (508) to the language processing components 240 of the system 120. The language processing components 240 process the input data and send the resulting NLU output data in the form of a skill invocation request (510) to the skill invocation component for forwarding to the appropriate skill and skill instance. The skill invocation component queries (512) the endpoint registry 270 for an entry corresponding to an account identifier corresponding to the input data and an intent (or skill identifier) indicated by the NLU output data. In the example operations shown in FIG. 5A, the endpoint registry 270 has an entry matching the parameters of the query, and thus returns (514) a connection identifier associated with the account identifier and the skill identifier to the skill invocation component. The skill invocation component uses the connection identifier to route a dispatch request (516) including the skill invocation request to the connection dispatcher 435 of the local host indicated by the connection identifier. The connection dispatcher 435 forwards the skill invocation request (518) over the network connection indicated by the connection identifier to the skill endpoint 495. Meanwhile, the connection dispatcher 435 registers (520) the request with the message router 445. The skill instance at the skill endpoint 495 can return a response (522) including skill output data generated by the skill instance in response to the skill invocation request. The connection server 440 receives the incoming message, and forwards the response (524) to the message router 445. The message router 445 can inspect the response and match it with a previously registered request. The message router 445 can forward the response (526) to the connection dispatcher 435 that sent the corresponding outgoing message. The connection dispatcher 435 can forward the response (528) to the skill invocation component, which returns the response (530) to the language processing components 240 (e.g., for text-to-speech processing or other processing) before the system returns output data (532) based on the response to the test device 110.

FIG. 5B illustrates example operations for routing a skill invocation request to a default skill instance hosted by a skill system if the skill invocation request does not meet the conditions for routing to the dynamic skill endpoint. The operations in FIG. 5B can occur before, after, or concurrently with the operations in FIG. 5A.

The test device 110 sends input data corresponding to an utterance or other natural language input (540) to the language processing components 240 of the system 120. The language processing components 240 process the input data and send the resulting NLU output data in the form of a skill invocation request (542) to the skill invocation component for forwarding to the appropriate skill and skill instance. The skill invocation component queries (544) the endpoint registry 270 for an entry corresponding to an account identifier corresponding to the input data and an intent (or skill identifier) indicated by the NLU output data. In the example operations shown in FIG. 5B, the endpoint registry 270 has no entry matching the parameters of the query, and thus returns (546) either a null response or notification to apply default skill routing to the request to the skill invocation component. The skill invocation component, applying default routing, can forward the request (548) to the skill system 125 hosting the default instance of the skill. The skill system 125 can provide a response (550) to the request including skill output data to the skill invocation component. The skill invocation component can return the response (552) to the language processing components 240 (e.g., for text-to-speech processing or other processing) before the system returns output data (554) based on the response to the test device 110.

Figure 6:
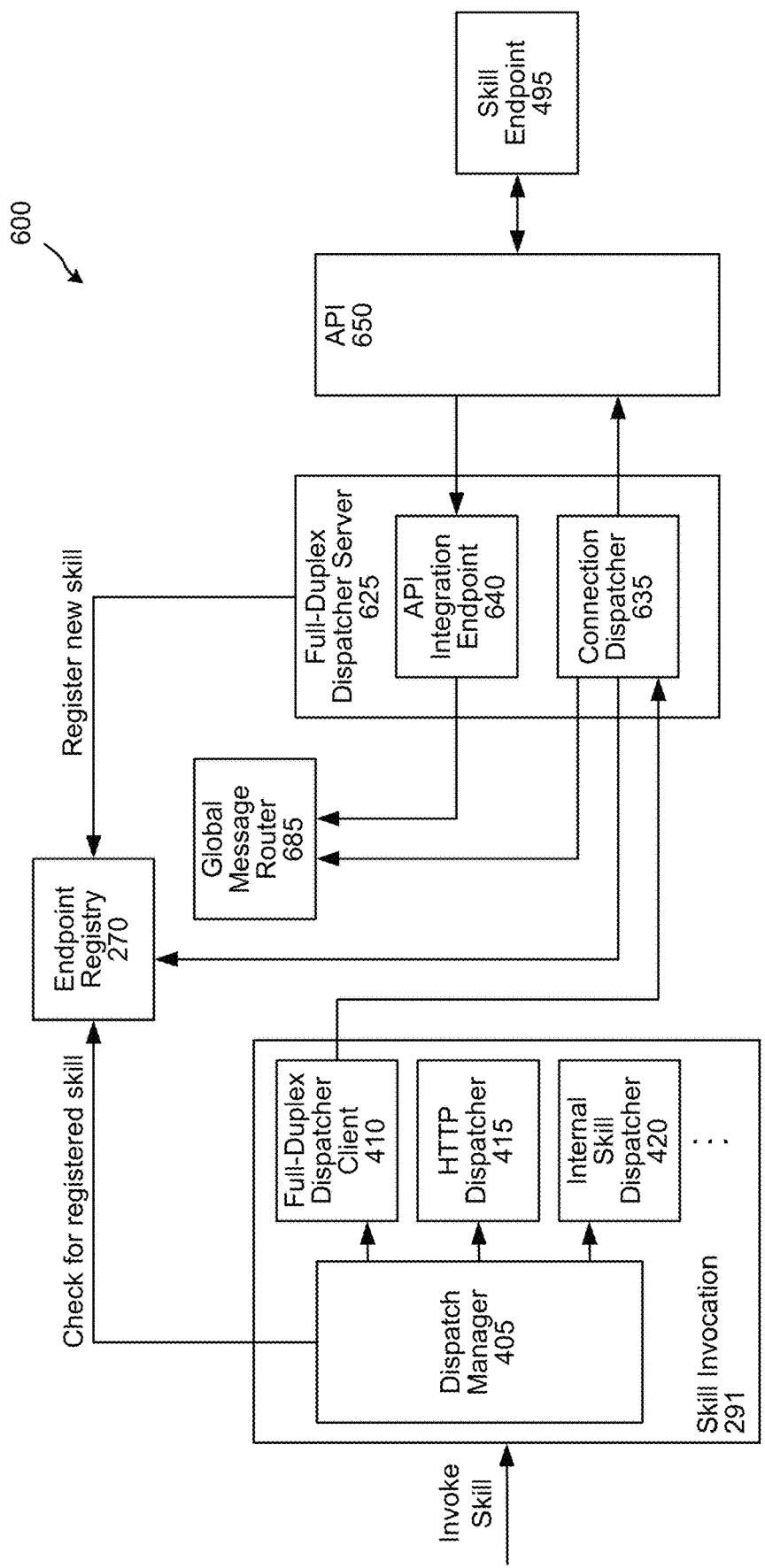
FIG. 6 illustrates a high-level view of a second example system for registering dynamic skill endpoints and invoking registered skills using an API component, according to embodiments of the present disclosure.

FIGS. 6 and 8 illustrate a high-level view of a second example system 600 and a third example system 800, respectively, for registering dynamic skill endpoints and invoking registered skills using an application programming interface (API) component, according to embodiments of the present disclosure. Using the API component 650 is advantageous because the systems 600 and 800 do not need to maintain an externally exposed TCP virtual IP address (VIP) endpoint, and thus does not need to deal with VIP monitoring or throttling. The API component 650 API component 650 can maintain connections to the skill endpoints 495. Additional components of the systems 600 and 800 can handle the functionality of (a) listening for new connection requests, and (b) correlating outgoing messages (skill invocation requests) with incoming messages (skill output data). The systems 600 and 800 represent two different examples of implementing such features.

FIG. 6 illustrates a high-level view of a second example system 600 for registering dynamic skill endpoints and invoking registered skills using an API component, according to embodiments of the present disclosure. The system 600 includes skill invocation component similar or equivalent to the skill invocation component previously described. The skill invocation component dispatches skill invocation requests to the appropriate skill endpoint based on associations stored in the endpoint registry 270 or on information stored in a skill definition or manifest. For dynamic skill endpoints registered in the endpoint registry 270, the skill invocation component can dispatch the skill invocation requests to the local host 625 indicated by the association stored in the endpoint registry 270. The system 600 can include at least one local host 625 sharing a global message router 685 for correlating each incoming message to a pending request (previously sent outgoing message). In the system 600, the global message router 685 can correlate an incoming response message with an outstanding request to route the incoming response to the local host 625 that sent the outstanding request. This is in contrast to the systems 400 and 401, where each dispatcher server 425 or connection server 440 had its own local message router. Each local host 625 interfaces with the API component 650 for sending and receiving skill invocation requests, skill output data, and new connection requests. A connection dispatcher 635 can send the skill invocation requests, and the API integration endpoint 640 can receive incoming messages including the skill output data and new connection requests.

The connection dispatcher 635 can listen for incoming dispatch requests (skill invocation requests) from the skill invocation component. The connection dispatcher 635 can look up a connection identifier for the API component 650 network connection for the skill from the endpoint registry 270 and dispatch the skill invocation request through the API component 650 to the network connection indicated by the connection identifier. The connection dispatcher 635 can periodically poll the global message router 685 for responses to pending requests, and return the request to the skill invocation component once available.

The API component 650 can be a server or server system that represents a single entry point into the system 600. In some implementations, the API component 650 can be an HTTPS server. The API component 650 can receive the connection requests and provide a local endpoint for network connections to skill endpoints 495. The API component 650 can handle tasks involved in maintaining the network connections including, for example and without limitation, traffic management, throttling, monitoring, and authorization. In some implementations, the API component 650 can be an API gateway.

The API integration endpoint 640 registers with the API component 650 so that it can listen to all incoming messages from the API component 650. The API integration endpoint 640 validates incoming connection requests to determine whether the request has valid authorization to register a network connection or channel from a skill endpoint 495 for a particular skill. Such a validation can include validating a token received from the skill endpoint 495. The token can prove that the connection came from, for example, a valid skill workstation 110m for the skill.

The global message router 685 can correlate incoming messages with previously sent outgoing questions; that is, it can match skill output data received at the API component 650 with the skill invocation request to which it responds. In some implementations, the network connection between the API component 650 and the skill endpoint 495 is a bi-directional full-duplex channel lacking a notion of request/response. For example, the network connection can be a WebSocket connection. Thus, to maintain the request/response relationship, the global message router 685 can correlate, for example, a message identifier in a received incoming message to a message identifier stored with respect to a previous outgoing message. The API integration endpoint 640 sends incoming response messages to global message router 685 where they are stored so they can be returned to the connection dispatcher 635 on the next poll request. Because the connection dispatcher 635 periodically polls the global message router 685 for responses, the global message router 685 of the system 600 can be thought of as a "pull-based message router." Example operations of the system 600 and its various components are described below with reference to FIGS. 7A and 7B.

Figure 7B:
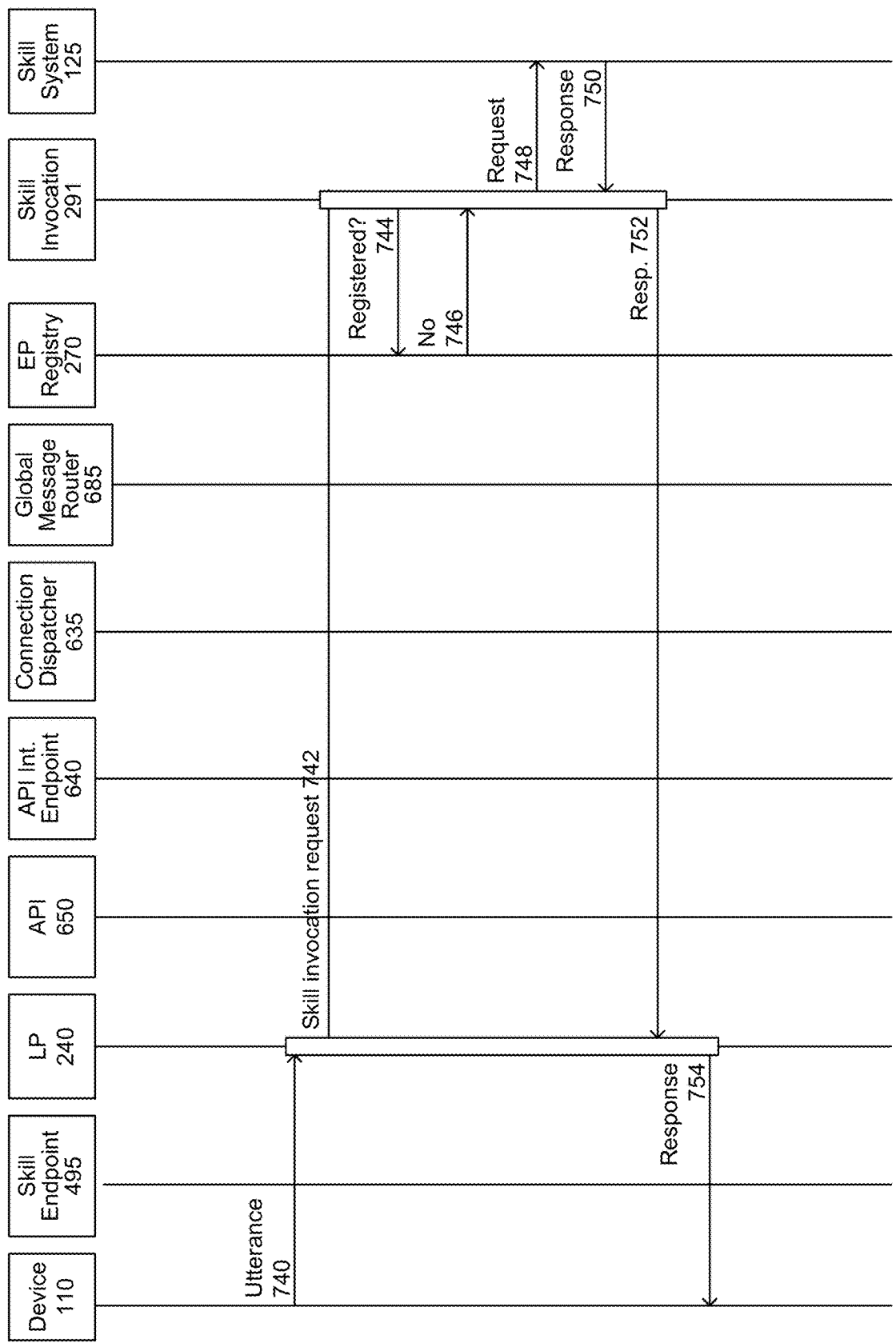

FIGS. 7A and 7B show a signal flow diagram illustrating second example processes for registering dynamic skill endpoints and invoking skills with and without registered dynamic endpoints using an API gateway, in accordance with embodiments of the present disclosure. The signal flow diagram illustrates operations between a test device 110, a skill endpoint 495 (representing, for example, a workstation hosting an instance of a skill under test, or a personal device hosting a personal instance of a skill), language processing (LP) components 240, an API component 650, an API integration endpoint 640, a connection dispatcher 635, a global message router 685, an endpoint (EP) registry 270, a skill invocation component, and a skill system 125 (representing, for example, a default or public instance of a skill). FIG. 7A illustrates example operations for registering a dynamic skill endpoint and routing a skill invocation request to the registered dynamic skill endpoint. FIG. 7B illustrates example operations for routing a skill invocation request to a default skill instance in a skill system if the skill invocation request does not meet the conditions for routing to the dynamic skill endpoint.

The skill endpoint 495 sends a connection request (702) to the API component 650, which can be configured to receive all incoming messages to the system 120 from dynamic skill endpoints. The API component 650 notifies (704) the API integration endpoint 640 of the request. The API integration endpoint 640 registers a new skill endpoint (706) with the endpoint registry 270. The API component 650 can complete a connection handshake (708) with the skill endpoint 495 on behalf of the system 120. The network connection between the skill endpoint 495 and the system 120 is thus established.

The test device 110 sends input data corresponding to an utterance or other natural language input (710) to the language processing components 240 of the system 120. The language processing components 240 process the input data and send the resulting NLU output data in the form of a skill invocation request (712) to the skill invocation component for forwarding to the appropriate skill and skill instance. The skill invocation component queries (714) the endpoint registry 270 for an entry corresponding to an account identifier corresponding to the input data and an intent (or skill identifier) indicated by the NLU output data. In the example operations shown in FIG. 7A, the endpoint registry 270 has an entry matching the parameters of the query, and thus returns (716) a connection identifier associated with the account identifier and the skill identifier to the skill invocation component. The skill invocation component uses the connection identifier to route a dispatch request (718) including the skill invocation request to the connection dispatcher 635 of the local host indicated by the connection identifier. The connection dispatcher 635 forwards the skill invocation request (720) to the API component 650, which forwards the request (722) to the skill endpoint 495. Meanwhile, the connection dispatcher 635 will periodically poll (724) the global message router 685 to see if the system 120 has received a response. The skill instance at the skill endpoint 495 can return a response (726) including skill output data generated by the skill instance in response to the skill invocation request. The API component 650 receives the incoming message, and forwards the response (728) to the API integration endpoint 640. The API integration endpoint 640 forwards the response (730) to the global message router 685, which holds the response until polled by the connection dispatcher 635. The connection dispatcher 635 can retrieve the response from the global message router 685 and forward the response (732) to the skill invocation component, which returns the response (734) to the language processing components 240 (e.g., for text-to-speech processing or other processing) before the system returns output data (736) based on the response to the test device 110.

FIG. 7B illustrates example operations for routing a skill invocation request to a default skill instance hosted by a skill system if the skill invocation request does not meet the conditions for routing to the dynamic skill endpoint. The operations in FIG. 7B can occur before, after, or concurrently with the operations in FIG. 7A.

The test device 110 sends input data corresponding to an utterance or other natural language input (740) to the language processing components 240 of the system 120. The language processing components 240 process the input data and send the resulting NLU output data in the form of a skill invocation request (742) to the skill invocation component for forwarding to the appropriate skill and skill instance. The skill invocation component queries (744) the endpoint registry 270 for an entry corresponding to an account identifier corresponding to the input data and an intent (or skill identifier) indicated by the NLU output data. In the example operations shown in FIG. 7B, the endpoint registry 270 has no entry matching the parameters of the query, and thus returns (746) either a null response or notification to apply default skill routing to the request to the skill invocation component. The skill invocation component, applying default routing, can forward the request (748) to the skill system 125 hosting the default instance of the skill. The skill system 125 can provide a response (750) to the request including skill output data to the skill invocation component. The skill invocation component can return the response (752) to the language processing components 240 (e.g., for text-to-speech processing or other processing) before the system returns output data (754) based on the response to the test device 110.

FIG. 8 illustrates a high-level view of a third example system for registering dynamic skill endpoints and invoking registered skills using an API gateway in conjunction with one or more global message routers, according to embodiments of the present disclosure. Using the API component 650 is advantageous because the system 800 does not need to maintain an externally exposed TCP virtual IP address (VIP) endpoint, and thus does not need to deal with VIP monitoring or throttling. The API component 650 can maintain connections to the skill endpoints 495. Additional components of the system 800 can handle the functionality of (a) listening for new connection requests, and (b) correlating outgoing messages (skill invocation requests) with incoming messages (skill output data).

The system 800 includes a skill invocation fleet 492 including Skill invocation components, 291b, through 291n (collectively "Skill invocation components"). A load balancer 850 can distribute incoming skill invocation requests to one of the Skill invocation components. The Skill invocation components can route skill invocation requests according to data retrieved from the endpoint registry 270. The system includes a full-duplex dispatcher server fleet 826 including local hosts 825a, 825b, through 825n (collectively "local hosts 825"). A load balancer 855 can distribute skill invocation requests from the Skill invocation components to a local host 825. Each local host 825 includes a connection dispatcher 835 for routing skill invocation out of the API component 650 and to the appropriate skill endpoint 495 via the network connection specified in the data retrieved from the endpoint registry 270; e.g., a connection identifier. Skill output data returning from the skill endpoint 495 can be received at the API component 650 and routed by a load balancer 860 to a global message router 885a, 885b, through 885n (collectively "global message routers 885") of the global message router fleet 886. The global message router 885 can correlate the skill output data to the skill invocation request to which it responds, and route the skill output data to the appropriate local host 825. A connection router 845 of the local host 825 can receive the skill output data and route it back to the appropriate skill invocation component for processing by the system 120, including providing output data to a user.

In the system 800, each local host 825 can encode its address in outgoing messages in a manner that results in the local host address being contained in the returning message from the skill. Thus, on return, any global message router 885 that receives the response can determine the local host address from the incoming message to determine which local host 825 should be notified of an available response. In some implementations, the encoding and decoding of the local host address can include encryption to keep the local host address opaque to the skills. In some implementations, the encrypted local address can be put in field of the skill invocation request that the skill reproduces in the skill output data without modification; for example, in a request identifier field. Because the global message router 685 notifies the connection router 845 of awaiting responses, the global message router 885 of the system 800 can be thought of as a "push-based message router." Example operations of the system 800 and its various components are described below with reference to FIGS. 9A and 9B.

FIGS. 9A and 9B show a signal flow diagram illustrating third example processes for registering dynamic skill endpoints and invoking skills with and without registered dynamic endpoints using an API gateway in conjunction with one or more global message routers, in accordance with embodiments of the present disclosure. The signal flow diagram illustrates operations between a test device 110, a skill endpoint 495 (representing, for example, a workstation hosting an instance of a skill under test, or a personal device hosting a personal instance of a skill), language processing (LP) components 240, an API component 650, a connection router 845, a connection dispatcher 835, a global message router 885, an endpoint (EP) registry 270, a skill invocation component, and a skill system 125 (representing, for example, a default or public instance of a skill). FIG. 9A illustrates example operations for registering a dynamic skill endpoint and routing a skill invocation request to the registered dynamic skill endpoint. FIG. 9B illustrates example operations for routing a skill invocation request to a default skill instance in a skill system if the skill invocation request does not meet the conditions for routing to the dynamic skill endpoint.

The skill endpoint 495 sends a connection request (902) to the API component 650, which can be configured to receive all incoming messages to the system 120 from dynamic skill endpoints. The API component 650 notifies (904) the global message router 885 of the request. The global message router 885 registers a new skill endpoint (906) with the endpoint registry 270. The API component 650 can complete a connection handshake (908) with the skill endpoint 495 on behalf of the system 120. The network connection between the skill endpoint 495 and the system 120 is thus established.

The test device 110 sends input data corresponding to an utterance or other natural language input (910) to the language processing components 240 of the system 120. The language processing components 240 process the input data and send the resulting NLU output data in the form of a skill invocation request (912) to the skill invocation component for forwarding to the appropriate skill and skill instance. The skill invocation component queries (914) the endpoint registry 270 for an entry corresponding to an account identifier corresponding to the input data and an intent (or skill identifier) indicated by the NLU output data. In the example operations shown in FIG. 9A, the endpoint registry 270 has an entry matching the parameters of the query, and thus returns (916) a connection identifier associated with the account identifier and the skill identifier to the skill invocation component. The skill invocation component uses the connection identifier to route a dispatch request (918) including the skill invocation request to the connection dispatcher 835 of the local host indicated by the connection identifier. The connection dispatcher 835 forwards the skill invocation request (920) to the API component 650, which forwards the request (922) to the skill endpoint 495. Meanwhile, the connection dispatcher 835 will register (924) the request with the connection router 845. The skill instance at the skill endpoint 495 can return a response (926) including skill output data generated by the skill instance in response to the skill invocation request. The API component 650 receives the incoming message, and forwards the response (928) to the global message router 885. The global message router 885 can inspect the response and notify (930) the appropriate connection router 845 that the response is available. The connection router 845 can retrieve the response from the global message router 885 and forward the response (932) to the connection dispatcher 835, which forwards the response (934) to the skill invocation component. The skill invocation component returns the response (936) to the language processing components 240 (e.g., for text-to-speech processing or other processing) before the system returns output data (938) based on the response to the test device 110.

FIG. 9B illustrates example operations for routing a skill invocation request to a default skill instance hosted by a skill system if the skill invocation request does not meet the conditions for routing to the dynamic skill endpoint. The operations in FIG. 9B can occur before, after, or concurrently with the operations in FIG. 9A.

The test device 110 sends input data corresponding to an utterance or other natural language input (940) to the language processing components 240 of the system 120. The language processing components 240 process the input data and send the resulting NLU output data in the form of a skill invocation request (942) to the skill invocation component for forwarding to the appropriate skill and skill instance. The skill invocation component queries (944) the endpoint registry 270 for an entry corresponding to an account identifier corresponding to the input data and an intent (or skill identifier) indicated by the NLU output data. In the example operations shown in FIG. 9B, the endpoint registry 270 has no entry matching the parameters of the query, and thus returns (946) either a null response or notification to apply default skill routing to the request to the skill invocation component. The skill invocation component, applying default routing, can forward the request (948) to the skill system 125 hosting the default instance of the skill. The skill system 125 can provide a response (950) to the request including skill output data to the skill invocation component. The skill invocation component can return the response (952) to the language processing components 240 (e.g., for text-to-speech processing or other processing) before the system returns output data (954) based on the response to the test device 110.

Figure 10:
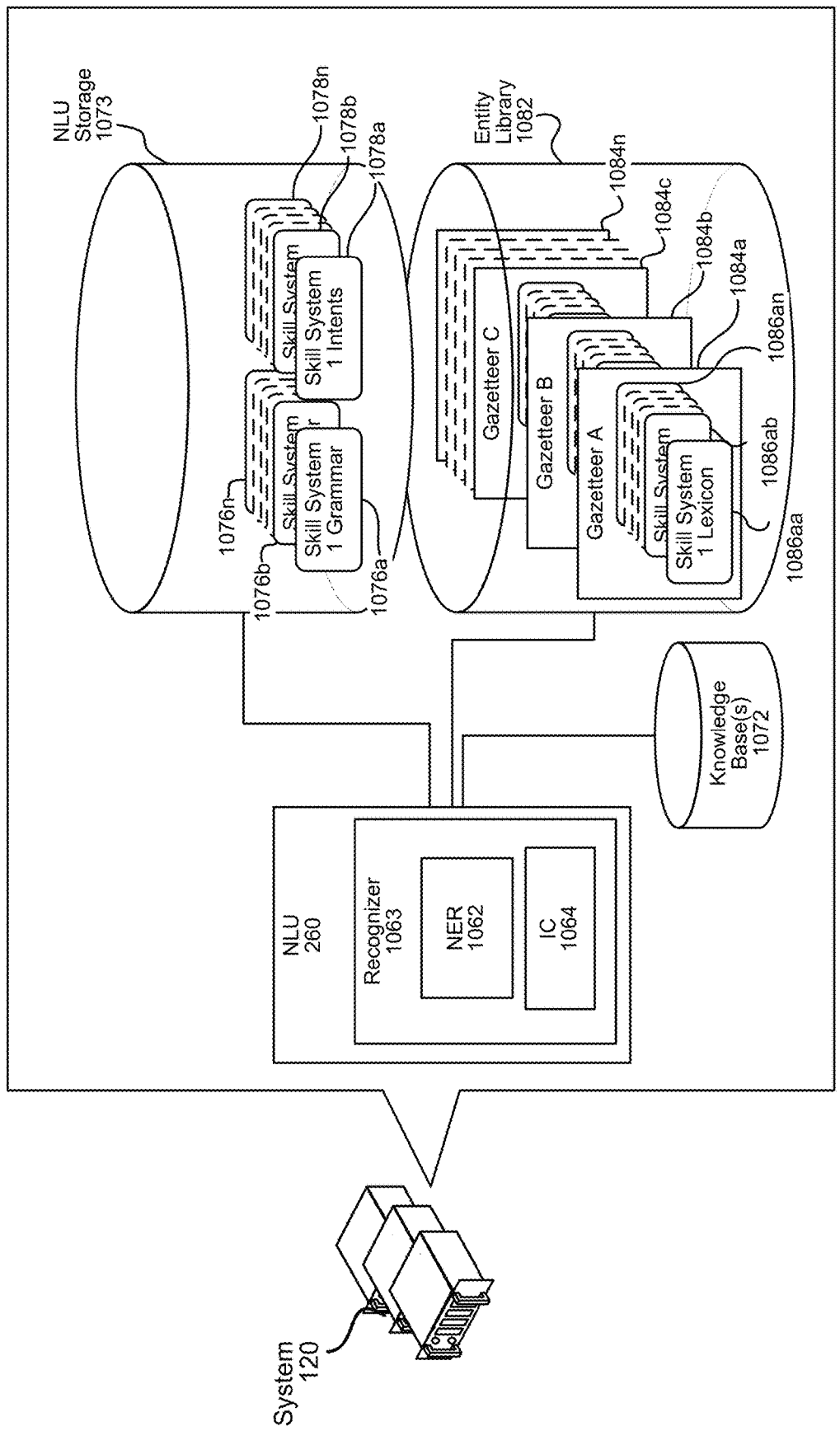
FIG. 10 is a conceptual diagram of how natural language processing is performed, according to embodiments of the present disclosure.
Figure 11:
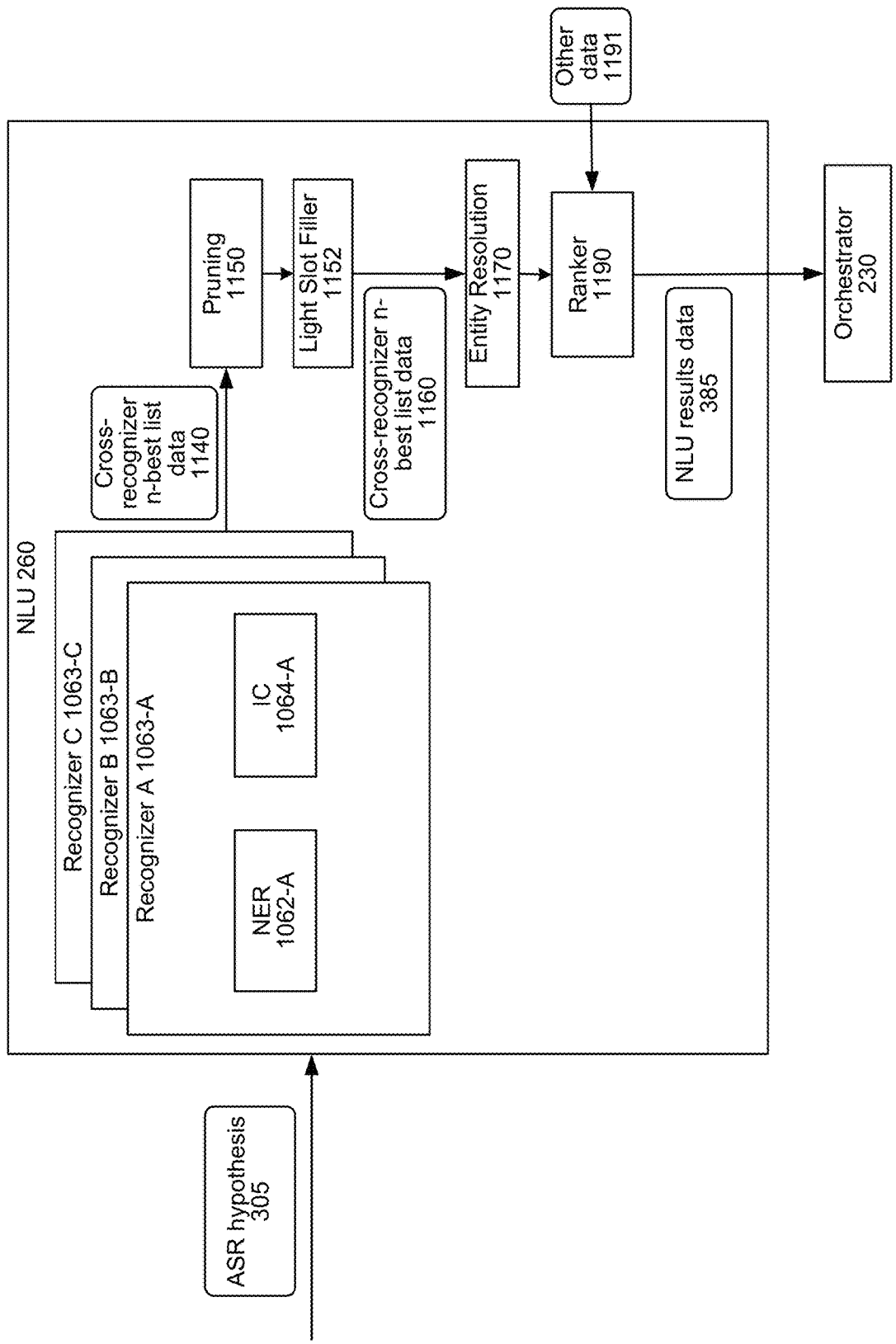
FIG. 11 is a conceptual diagram of how natural language processing is performed, according to embodiments of the present disclosure.

FIGS. 10 and 11 are conceptual diagrams showing how the NLU component 260 may perform NLU processing, according to embodiments of the present disclosure. The NLU component 260 may include one or more recognizers 1063. In at least some embodiments, a recognizer 1063 may be associated with a skill system 125 (e.g., the recognizer may be configured to interpret text data to correspond to the skill system 125). In at least some other examples, a recognizer 1063 may be associated with a domain (i.e., the recognizer may be configured to interpret text data to correspond to the domain). The recognizer 1063 can serve as a search provider interface to the skills and/or domains such as a music domain.

Recognizers 1063 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system. Thus, the system 100 can fan out searches related to entity recognition and resolution across the recognizers 1063.

The NLU component 260 may communicate with various storages. The NLU component 260 may communicate with an NLU storage 1073, which includes skill system grammars (1076a-1076n), representing how natural language inputs may be formulated to invoke skill systems 125, and skill system intents (1078a-1078n) representing intents supported by respective skill systems 125.

Each recognizer 1063 may be associated with a particular grammar 1076, a particular intent(s) 1078, and a particular personalized lexicon 1086 (stored in an entity library 1082). A gazetteer 1084 may include skill system-indexed lexical information associated with a particular user. For example, Gazetteer A (1084a) may include skill system-indexed lexical information 1086aa to 1086an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 1063 may include a named entity recognition (NER) component 1062 that attempts to identify grammars and lexical information that may be used to construe meaning with respect to text data input therein. A NER component 1062 identifies portions of text data that correspond to a named entity that may be recognizable by the system 120. A NER component 1062 may also determine whether a word refers to an entity that is not explicitly mentioned in the text, for example "him," "her," "it" or other anaphora, exophora or the like.

A NER component 1062 applies grammar models 1076 and lexical information 1086 associated with one or more skill systems 125 to determine a mention of one or more entities in text data input therein. In this manner, a NER component 1062 identifies "slots" (i.e., particular words in text data) that may be needed for later processing. A NER component 1062 may also label each slot with a type (e.g., noun, place, city, artist name, song name, etc.).

Each grammar model 1076 may include the names of entities (i.e., nouns) commonly found in speech about a particular skill system 125 to which the grammar model 1076 relates, whereas lexical information 1086 may be personalized to the user identifier output by a user recognition component 295 (described herein with reference to FIG. 2) for the natural language input. For example, a grammar model 1076 associated with a shopping skill system may include a database of words commonly used when people discuss shopping.

A downstream process called named entity resolution actually links a portion of text data (identified by a NER component 1062) to a specific entity known to the system 120. To perform named entity resolution, the NLU component 260 may use gazetteer information (1084a-1084n) stored in the entity library storage 1082. The gazetteer information 1084 may be used to match text data (identified by a NER component 1062) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 1063 may also include an IC component 1064 that processes text data input thereto to determine an intent(s) of a skill system(s) 125 that potentially corresponds to the natural language input represented in the text data. An intent corresponds to an action to be performed that is responsive to the natural language input represented by the text data. An IC component 1064 may communicate with a database 1078 of words linked to intents. For example, a music intent database may link words and phrases such as "quiet," "volume off," and "mute" to a <Mute> intent. An IC component 1064 identifies potential intents by comparing words and phrases in text data to the words and phrases in an intents database 1078 associated with the skill system(s) 125 that is associated with the recognizer 1063 implementing the IC component 1064.

The intents identifiable by a specific IC component 1064 may be linked to one or more skill system-specific grammar frameworks 1076 with "slots" to be filled. Each slot of a grammar framework 1076 corresponds to a portion of text data that a NER component 1062 believes corresponds to an entity. For example, a grammar framework 1076 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 1076 may not be structured as sentences, but rather based on associating slots with grammatical tags.

For example, a NER component 1062 may identify words in text data as subject, object, verb, preposition, etc. based on grammar rules and/or models prior to recognizing named entities in the text data. An IC component 1064 (implemented by the same recognizer 1063) may use the identified verb to identify an intent. The NER component 1062 may then determine a grammar model 1076 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 1062 may then search corresponding fields in a lexicon 1086, attempting to match words and phrases in the text data the NER component 1062 previously tagged as a grammatical object or object modifier with those identified in the lexicon 1086.

A NER component 1062 may perform semantic tagging, which is the labeling of a word or combination of words according to their type/semantic meaning. A NER component 1062 may parse text data using heuristic grammar rules, or a model may be constructed using techniques such as hidden Markov models, maximum entropy models, log linear models, conditional random fields (CRF), and the like. For example, a NER component 1062, implemented by a music skill system or music domain recognizer 1063, may parse and tag text data corresponding to "play mother's little helper by the rolling stones" as {Verb}: "Play," {Object}: "mother's little helper," {Object Preposition}: "by," and {Object Modifier}: "the rolling stones." The NER component 1062 may identify "Play" as a verb based on a word database associated with the music skill system or music domain, which an IC component 1064 may determine corresponds to a <PlayMusic> intent. At this stage, no determination has been made as to the meaning of "mother's little helper" and "the rolling stones," but based on grammar rules and models, the NER component 1062 has determined that the text of these phrases relates to the grammatical object (i.e., entity).

The frameworks linked to the intent are then used to determine what database fields should be searched to determine the meaning of these phrases, such as searching a user's gazetteer 1084 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 1084 does not resolve a slot/field using gazetteer information, the NER component 1062 may search a database of generic words (in the knowledge base 1072). For example, if the text data corresponds to "play songs by the rolling stones," after failing to determine an album name or song name called "songs" by "the rolling stones," the NER component 1062 may search a music skill system vocabulary for the word "songs." In the alternative, generic words may be checked before the gazetteer information, or both may be tried, potentially producing two different results.

A recognizer 1063 may tag text data to attribute meaning thereto. For example, a recognizer 1063 may tag "play mother's little helper by the rolling stones" as: {skill system} Music, {intent} Play Music, {artist name} rolling stones, {media type} SONG, and {song title} mother's little helper. For further example, a recognizer 1063 may tag "play songs by the rolling stones" as: {skill system} Music, {intent} Play Music, {artist name} rolling stones, and {media type} SONG.

As described above, more than one recognizer 1063 may process with respect to text data representing a single natural language input. In such instances, each recognizer 1063 may output at least one NLU hypothesis including an intent indicator (determined by an IC component 1064 of the recognizer 1063) and at least one tagged named entity (determined by a NER component 1062 of the recognizer 1063).

The NLU component 260 may compile the NLU hypotheses (output by multiple recognizers 1063) into cross-recognizer N-best list data 1140. Each NLU hypothesis may be associated with a respective score indicating a likelihood that the NLU hypothesis corresponds to the domain, one or more skill systems 125, etc. associated with the recognizer 1063 from which the NLU hypothesis was output. For example, the cross-recognizer N-best list data 1140 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface with each line of the foregoing corresponding to a different NLU hypothesis and associated score.

The NLU component 260 may send the cross-recognizer N-best list data 1140 to a pruning component 1150, which sorts the NLU hypotheses, represented in the cross-recognizer N-best list data 1140, according to their respective scores. The pruning component 1150 may then perform score thresholding with respect to the cross-recognizer N-best list data 1140. For example, the pruning component 1150 may select NLU hypotheses, represented in the cross-recognizer N-best list data 1140, associated with scores satisfying (e.g., meeting and/or exceeding) a threshold score. The pruning component 1150 may additionally or alternatively perform number of NLU hypothesis thresholding. For example, the pruning component 1150 may select a threshold number of top-scoring NLU hypotheses represented in the cross-recognizer N-best list data 1140.

The pruning component 1150 may generate cross-recognizer N-best list data 1160 including the selected NLU hypotheses. The purpose of the pruning component 1150 is to create a reduced list of NLU hypotheses so that downstream, more resource intensive, processes may only operate on NLU hypotheses that most likely represent the natural language input.

The NLU component 260 may include a light slot filler component 1152 that takes text from slots, represented in the NLU hypotheses output by the pruning component 1150, and alter it to make the text more easily processed by downstream components. The light slot filler component 1152 may perform low latency operations that do not involve heavy operations such as reference to a knowledge base. The purpose of the light slot filler component 1152 is to replace words with other words or values that may be more easily understood by downstream components. For example, if a NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-recognizer N-best list data 1160.

The cross-recognizer N-best list data 1160 may be sent to an entity resolution component 1170. The entity resolution component 1170 can apply rules or other instructions to standardize labels or tokens in the NLU hypotheses represented in the cross-recognizer N-best list data 1160. The precise transformation may depend on the skill system 125, domain, etc. to which a NLU hypothesis relates. For example, for a travel skill system-specific NLU hypothesis, the entity resolution component 1170 may transform text corresponding to "Boston airport" to the standard BOS three-letter code referring to the airport. The entity resolution component 1170 can refer to a knowledge base that is used to specifically identify the precise entity referred to in each slot of each NLU hypothesis represented in the cross-recognizer N-best list data 1160.

Specific intent/slot combinations may also be tied to a particular source, which may then be used to resolve the text. In the example "play songs by the stones," the entity resolution component 1170 may reference a personal music catalog, Amazon Music account, a user profile, or the like. The entity resolution component 1170 may output N-best list data, altered from the cross-recognizer N-best list data 1160, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 1170 that are each specific to one or more different skill systems 125, domains, etc.

One or more models for the entity resolution component 1170 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The NLU component 260 may include a ranker component 1190 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 1190 may assign the first NLU hypothesis a higher score than a second NLU hypothesis including at least one slot that is unfilled/unresolved by the entity resolution component 1170.

The ranker component 1190 may apply re-scoring, biasing, or other techniques. To do so, the ranker component 1190 may consider not only the data output by the entity resolution component 1170, but may also consider other data 1191. The other data 1191 may include a variety of information.

For example, the other data 1191 may include skill system 125 rating or popularity data. For example, if a skill system 125 has a high rating, the ranker component 1190 may increase the score of a NLU hypothesis associated with that skill system 125, and vice versa.

The other data 1191 may additionally or alternatively include information about skill systems 125 that have been enabled by the user that originated the natural language input. For example, the ranker component 1190 may assign higher scores to NLU hypotheses associated with enabled skill systems 125 than NLU hypotheses associated with skill systems 125 that have not been enabled by the user.

The other data 1191 may additionally or alternatively include data indicating system usage history (e.g., specific to the user), such as if the user, that originated the natural language input, regularly invokes a particular skill system 125 or does so at particular times of day. The other data 1191 may additionally or alternatively include data indicating date, time, location, weather, type of device 110, user identifier, context, as well as other information. For example, the ranker component 1190 may consider when any particular skill system 125 is currently active with respect to the present user and/or device 110 (e.g., music being output by the skill system 125, a game being executed by the skill system 125, etc.).

The ranker component 1190 may output NLU results data 385 including one or more NLU hypotheses. The NLU component 260 may send the NLU results data 385 to the orchestrator component 230.

The NLU component 260 sends the NLU results data 385 (discussed below) to the orchestrator component 230. The orchestrator component 230 may then send a NLU hypothesis to an appropriate skill 290 and/or skill system 125 for processing and execution of a corresponding action. After processing the skill 290/125 may return to the orchestrator 230 skill output data 310. If called for, the skill output data 310 (or text data portions thereof) may be sent from the orchestrator 230 to a TTS component 280 for purposes of creating output audio data 320 representing synthesized speech (which in turn represents the content of the skill output data 310 which should correspond to a response to the original utterance). The system 120 may then cause the output audio data 320 to be returned to device 110 (or to another device) for output of the synthesized speech using the output audio data 320.

The system 120 may include one or more skills 290. A skill may be software running on the system 120 that is akin to a software application running on a traditional computing device. That is, a skill 290 may enable the system 120 to execute user commands involving specific functionality in order to provide data or produce some other requested output. The system 120 may be configured with more than one skill 290. For example, a weather service skill may enable the system 120 to provide weather information, a car service skill may enable the system 120 to book a trip with respect to a taxi or ride sharing service, a restaurant skill may enable the system 120 to order a pizza with respect to the restaurant's online ordering system, etc. A skill 290 may operate in conjunction between the system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The system 120 may be configured with a single skill 290 dedicated to interacting with more than one skill system 125.

Unless expressly stated otherwise, reference herein to a "skill" may include a skill 290 operated by the system 120 and/or skill operated by a skill system 125. Moreover, the functionality described herein as a skill may be referred to using many different terms, such as an action, bot, app, or the like.

Referring again to FIG. 2A, after receiving the NLU results data 385, the orchestrator component 230 may send the NLU results data 385 to a skill system 125. The system 120 may communicate with a variety of skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

Figure 12:
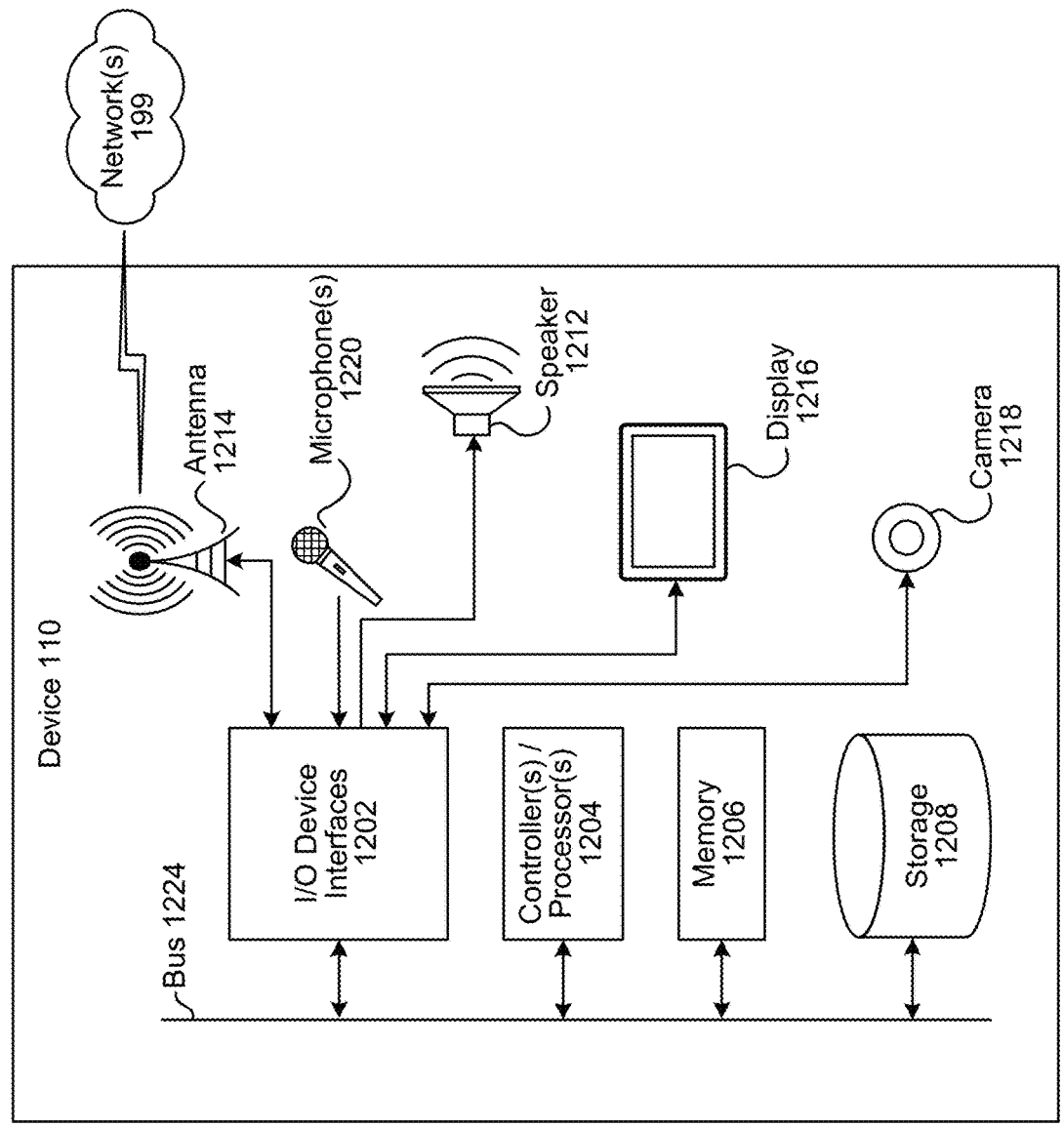
FIG. 12 is a block diagram conceptually illustrating example components of a device, according to embodiments of the present disclosure.
Figure 13:
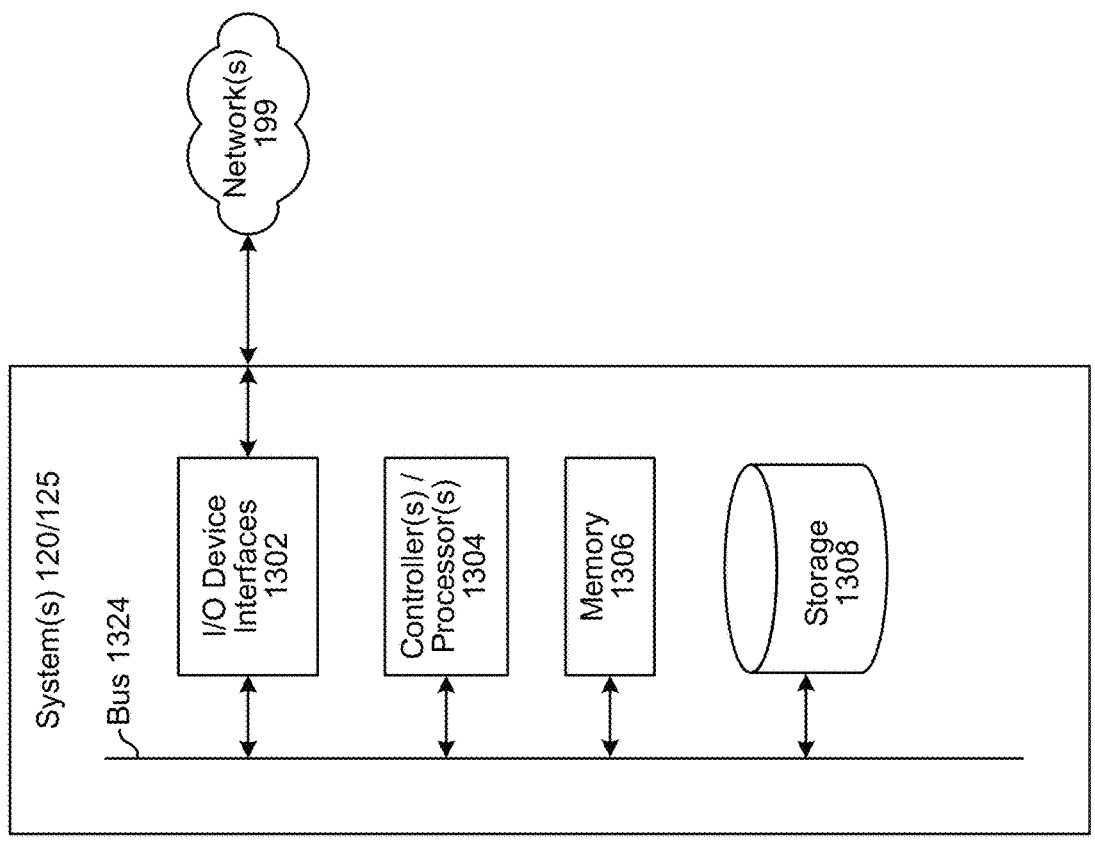
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of a remote device, such as the system 120, which may assist with ASR processing, NLU processing, etc.; and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1204/110m4), which may each include a central processing unit (CPU) for processing data and computer-readable instructions, and a memory (1206/110m6) for storing data and instructions of the respective device. The memories (1206/110m6) may individually include volatile random access memory (RAM), non-volatile read only memory (ROM), non-volatile magnetoresistive memory (MRAM), and/or other types of memory. Each device (110/120/125) may also include a data storage component (1208/110m8) for storing data and controller/processor-executable instructions. Each data storage component (1208/110m8) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/110m2).

Computer instructions for operating each device (110/120/125) and its various components may be executed by the respective device's controller(s)/processor(s) (1204/110m4), using the memory (1206/110m6) as temporary "working" storage at runtime. A device's computer instructions may be stored in a non-transitory manner in non-volatile memory (1206/110m6), storage (1208/110m8), or an external device(s). Alternatively, some or all of the executable instructions may be embedded in hardware or firmware on the respective device in addition to or instead of software.

Each device (110/120/125) includes input/output device interfaces (1202/110m2). A variety of components may be connected through the input/output device interfaces (1202/110m2), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/110m2) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1202/110m2), processor(s) (1204/110m4), memory (1206/110m6), and/or storage (1208/110m8) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

As illustrated in FIG. 14, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a Wi-Fi access point, such as the access point 145, or cellular network connection, or the like. Other devices are included as network-connected support devices, such as the system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a natural language processing (NLP) system, originating from a first device executing a first instance of a skill, a connection request including a first account identifier and a skill identifier corresponding to the first instance of the skill, wherein the first instance of the skill represents a personal skill instance;
   sending, from a first server of the NLP system to the first device in response to the connection request, a connection response corresponding to a persistent network connection between the first server and the first device;
   storing first data associating the skill identifier, the first account identifier, and a first connection identifier corresponding to the persistent network connection;
   receiving, from a second device, input data representing a first natural language input;
   determining that the input data corresponds to the first account identifier;
   processing the input data to determine natural language understanding (NLU) output data indicating an intent corresponding to the skill identifier;
   identifying, based on the skill identifier and the first account identifier, the connection identifier;
   determining the first server corresponding to the connection identifier;
   causing the first server to send the NLU output data and a first message identifier to the first device via the persistent network connection for processing by the first instance of the skill;
   receiving, by the first server from the first device via the persistent network connection, a second message identifier and skill output data corresponding to the first natural language input;
   determining that the second message identifier corresponds to the first message identifier; and
   sending, to the second device based on the determination that the second message identifier corresponds to the first message identifier, output data based at least in part on the skill output data.

2. The computer-implemented method of claim 1, wherein the first device lacks an Internet routable address, the method further comprising:
   receiving, from a third device, second input data corresponding to a second natural language input;
   determining that the second natural language input corresponds to a second account identifier;
   processing the second input data to determine second NLU output data indicating a second intent corresponding to the skill identifier;
   determining that the second account identifier and the skill identifier are not associated with the connection identifier; and
   sending the second NLU output data from the NLP system to a second instance of the skill, the second instance of the skill representing a default skill instance executing on a fourth device having an Internet routable address.

3. The computer-implemented method of claim 1, wherein:
   advertising, by the NLP system, a virtual internet protocol address (VIP), wherein the connection request includes the VIP as a destination address; and
   opening, in response to the connection request, a full-duplex network connection between the first server and the first device, wherein the persistent network connection includes the full-duplex network connection.

4. The computer-implemented method of claim 1, further comprising:
   receiving, at an application programming interface (API) component of the NLP system, the connection request;
   opening, in response to the connection request, a full-duplex network connection including the API component and the first device, wherein the persistent network connection includes the full-duplex network connection;
   receiving, by the API component from the first server, the NLU output data;
   sending, to the first device via the full-duplex network connection, the NLU output data and a first host identifier of the first server;
   receiving, from the first device via the full-duplex network connection, the output data and a second host identifier;
   determining that the second host identifier matches the first host identifier; and
   sending, from the API component to the first server subject to determining that the second host identifier matches the first host identifier, the output data.

5. A computer-implemented method comprising:
   receiving input data representing a natural language input;
   determining that the input data corresponds to an account identifier;

processing the input data to determine natural language understanding (NLU) output data indicating an intent corresponding to a skill identifier;

identifying, based on the skill identifier and the account identifier, a first connection identifier;

causing the NLU output data to be sent to a first device via a network connection corresponding to the first connection identifier for processing by a first instance of a skill executing on the first device;

receiving, from the first device, skill output data corresponding to the natural language input; and sending output data based at least in part on the skill output data.

6. The computer-implemented method of claim 5, wherein the first device lacks a static Internet routable address.

7. The computer-implemented method of claim 5, further comprising:

advertising, by a second device, a virtual internet protocol address (VIP);

receiving a connection request that includes the VIP as a destination address; and opening, in response to the connection request, a full-duplex network connection between the second device and the first device, wherein the network connection includes the full-duplex network connection.

8. The computer-implemented method of claim 5, further comprising:

receiving, at an application programming interface (API) component, a connection request;

opening, in response to the connection request, a full-duplex network connection between the API component and the first device, wherein the network connection includes the full-duplex network connection;

sending, by the API component to the first device via the full-duplex network connection, the NLU output data and a first device identifier;

receiving, from the first device, the output data and a second device identifier;

determining that the second device identifier matches the first device identifier; and sending the output subject to determining that the second device identifier matches the first device identifier.

9. The computer-implemented method of claim 5, wherein the first device lacks an Internet routable address.

10. The computer-implemented method of claim 5, further comprising:

receiving, prior to the input data, a connection request including the account identifier and the skill identifier corresponding to the skill; and associating the skill identifier and the account identifier with the first connection identifier.

11. The computer-implemented method of claim 5, wherein the first device is a mobile device and the first instance of the skill is an application executing on the mobile device, the method further comprising:

receiving a connection request from the application;

sending the NLU output data to the application via the network connection; and receiving the skill output data via the network connection.

12. The computer-implemented method of claim 5, further comprising:

causing the NLU output data to be sent to the first device with a first message identifier;

determining that a second message identifier received with the skill output data corresponds to the first message identifier; and sending the output data based at least on the determination that the second message identifier corresponds to the first message identifier.

13. A system, comprising:

at least one processor; and at least one memory comprising instructions that, when executed by the at least one processor, cause the system to:

receive input data representing a natural language input;

determine that the input data corresponds to an account identifier;

process the input data to determine natural language understanding (NLU) output data indicating an intent corresponding to a skill identifier;

identify, based on the skill identifier and the account identifier, a first connection identifier;

cause the NLU output data to be sent to a first device via a network connection corresponding to the first connection identifier for processing by a first instance of a skill executing on the first device;

receive, from the first device, skill output data corresponding to the natural language input; and send output data based at least in part on the skill output data.

14. The system of claim 13, wherein the at least one memory further comprises instructions that, when executed by the at least one processor, further cause the system to:

receive, from a second device, second input data corresponding to a second natural language input;

determine that the second natural language input corresponds to a second account identifier;

process the second input data to determine second NLU output data indicating a second intent corresponding to the skill identifier;

determine that the second account identifier and the skill identifier are not associated with a second connection identifier; and send the second NLU output data to a second instance of the skill executing on a third device based on an Internet routable address.

15. The system of claim 13, wherein the at least one memory further comprises instructions that, when executed by the at least one processor, further cause the system to:

advertise, by a second device, a virtual internet protocol address (VIP);

receive a connection request that includes the VIP as a destination address; and open, in response to the connection request, a full-duplex network connection between the second device and the first device, wherein the network connection includes the full-duplex network connection.

16. The system of claim 13, wherein the at least one memory further comprises instructions that, when executed by the at least one processor, further cause the system to:

receive, at an application programming interface (API) component, a connection request;

open, in response to the connection request, a full-duplex network connection between the API component and the first device, wherein the network connection includes the full-duplex network connection;

send, by the API component to the first device via the full-duplex network connection, the NLU output data and a first device identifier;

receive, from the first device, the output data and a second device identifier;

determine that the second device identifier matches the first device identifier; and send the output subject to determining that the second device identifier matches the first device identifier.

17. The system of claim 13, wherein the first device lacks an Internet routable address.

18. The system of claim 13, wherein the at least one memory further comprises instructions that, when executed by the at least one processor, further cause the system to:

receive, prior to the input data, a connection request including the account identifier and the skill identifier corresponding to the skill; and associate the skill identifier and the account identifier with the first connection identifier.

19. The system of claim 13, wherein the first device is a mobile device and the first instance of the skill is an application executing on the mobile device, and the at least one memory further comprises instructions that, when executed by the at least one processor, further cause the system to:

receive a connection request from the application;

send the NLU output data to the application via the network connection; and receive the skill output data via the network connection.

20. The system of claim 13, wherein the at least one memory further comprises instructions that, when executed by the at least one processor, further cause the system to:

cause the NLU output data to be sent to the first device with a first message identifier;

determine that a second message identifier received with the skill output data corresponds to the first message identifier; and send the output data based at least on the determination that the second message identifier corresponds to the first message identifier.

* * * * *